(12) United States Patent
Ogawa et al.

(10) Patent No.: US 11,259,363 B2
(45) Date of Patent: Feb. 22, 2022

(54) APPARATUS, SYSTEM, AND COMMUNICATION METHOD

(71) Applicant: Panasonic Intellectual Property Management Co., Ltd., Osaka (JP)

(72) Inventors: Tomoki Ogawa, Osaka (JP); Mitsuki Yamada, Shiga (JP); Masayuki Kozuka, Osaka (JP); Kunio Gobara, Osaka (JP); Yoshishige Yoshikawa, Osaka (JP); Shinya Nakai, Nara (JP); Junya Suzuki, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 2 days.

(21) Appl. No.: 16/971,300

(22) PCT Filed: Feb. 27, 2019

(86) PCT No.: PCT/JP2019/007573
§ 371 (c)(1),
(2) Date: Aug. 19, 2020

(87) PCT Pub. No.: WO2019/168033
PCT Pub. Date: Sep. 6, 2019

(65) Prior Publication Data
US 2020/0389938 A1  Dec. 10, 2020

Related U.S. Application Data

(60) Provisional application No. 62/637,527, filed on Mar. 2, 2018.

(51) Int. Cl.
*G08C 17/00* (2006.01)
*H04W 88/06* (2009.01)
(Continued)

(52) U.S. Cl.
CPC ......... *H04W 88/06* (2013.01); *H04L 12/2816* (2013.01); *H04W 52/0261* (2013.01);
(Continued)

(58) Field of Classification Search
CPC ............... H04W 88/06; H04W 76/14; H04W 52/0261; H04W 88/04; H04L 12/2816; H04L 2012/2841
(Continued)

(56) References Cited

U.S. PATENT DOCUMENTS

2003/0101459 A1* 5/2003 Edson ............... H04N 5/765
725/82
2010/0195562 A1 8/2010 Ishizu et al.
(Continued)

FOREIGN PATENT DOCUMENTS

JP  2010-183376 A  8/2010
JP  2015-201769 A  11/2015
(Continued)

OTHER PUBLICATIONS

International Search Report issued in corresponding International Patent Application No. PCT/JP2019/007573, dated May 21, 2019, with English translation.
(Continued)

*Primary Examiner* — Huy C Ho
(74) *Attorney, Agent, or Firm* — McDermott Will & Emery LLP

(57) ABSTRACT

Apparatus includes a plurality of wireless communication modules for connecting apparatus to a server that manages the apparatus via a plurality of networks different from one another; storage that stores, for each of the networks, a characteristic regarding communication; acquirer that acquires communication information indicating, for each of communication modules, whether communication via the
(Continued)

communication module is possible; identifier that identifies a specific communication module from among communication modules, the specific communication module being indicated by the communication information as being a communication module via which communication is possible, and being selected based on the characteristic; and controller that causes the specific communication module identified by identifier to connect to the server to enable communication.

9 Claims, 22 Drawing Sheets

(51) Int. Cl.
  *H04W 76/14* (2018.01)
  *H04L 12/28* (2006.01)
  *H04W 52/02* (2009.01)
  *H04W 88/04* (2009.01)
(52) U.S. Cl.
  CPC ........... *H04W 76/14* (2018.02); *H04W 88/04* (2013.01); *H04L 2012/2841* (2013.01)

(58) Field of Classification Search
  USPC .......................................................... 370/311
  See application file for complete search history.

(56) References Cited

U.S. PATENT DOCUMENTS

| | | |
|---|---|---|
| 2015/0289183 A1 | 10/2015 | Iimori |
| 2017/0244573 A1* | 8/2017 | Baum .................... G06F 16/954 |
| 2017/0359131 A1 | 12/2017 | Mashimo et al. |
| 2018/0054774 A1* | 2/2018 | Cohn ...................... G08B 29/08 |
| 2018/0287657 A1 | 10/2018 | Rose et al. |

FOREIGN PATENT DOCUMENTS

| | | |
|---|---|---|
| JP | 2016-63520 A | 4/2016 |
| KR | 101764133 B1 | 8/2017 |
| WO | 03/015444 A1 | 2/2003 |
| WO | 2017/136661 A1 | 8/2017 |

OTHER PUBLICATIONS

Extended European Search Report dated Apr. 7, 2021 issued for the corresponding European Patent Application No. 19761614.7.

* cited by examiner

FIG. 8

| TYPE | LoRa | NB-IoT | CAT.M1 |
|---|---|---|---|
| | NON-CELLULAR | CELLULAR | |
| RADIO LICENSE | UNNECESSARY (SHARED RADIO WAVE) | NECESSARY (CARRIER-ONLY) | |
| BASE-STATION MANAGEMENT | MOBILE PHONE CARRIER /CUSTOMER-OWNED | MOBILE PHONE CARRIER | |
| RADIO USAGE CHARGE | UNNECESSARY | NECESSARY | |
| COMMUNICATION FEE | LOW COST | APPROX. ABOUT 20 TIMES THAT OF LoRa | APPROX. ABOUT 50 TIMES THAT OF LoRa |
| COMMUNICATION STABILITY | UNSTABLE | GUARANTEED TO SOME EXTENT BY CARRIER | |
| FREQUENCY BAND | 900 MHz | 700 TO 900 MHz | 700 TO 900 MHz |
| MAXIMUM BAND | 200 kHz | 200 kHz | 1 MHz |
| COMMUNICATION SPEED | 0.3 TO 50 kbps | UP TO SEVERAL TENS kbps | UP TO 1 Mbps |
| COMMUNICATION DISTANCE | APPROX. 1 TO 20 km | APPROX. 1 TO 20 km | APPROX. 1 TO 10 km |
| TOLERANCE FOR COMMUNICATION CONCENTRATION | LOW | HIGH | |

| TIME PERIOD | | NUMBER OF SIMS |
|---|---|---|
| SATURDAY AND SUNDAY | 0:00 ~ 9:00 | 200 |
| | 9:00 ~ 12:00 | 500 |
| | 17:00 ~ 24:00 | 300 |
| MONDAY TO FRIDAY | 0:00 ~ 6:00 | 100 |
| | 6:00 ~ 8:00 | 800 |
| | 18:00 ~ 20:00 | 800 |
| | OTHER TIME PERIODS | 500 | ically connect to and communicate with the server via a communication module via which communication with the server is possible and that is selected based on the characteristic regarding communication via a network from the plurality of communication modules included in the apparatus. Accordingly, the apparatus can be appropriately connected to and controlled by the control cloud.

APPARATUS, SYSTEM, AND COMMUNICATION METHOD

CROSS-REFERENCE OF RELATED APPLICATIONS

This application is the U.S. National Phase under 35 U.S.C. § 371 of International Patent Application No. PCT/JP2019/007573, filed on Feb. 27, 2019, which in turn claims the benefit of U.S. Application No. 62/637,527, filed on Mar. 2, 2018, the entire disclosures of which Applications are incorporated by reference herein.

TECHNICAL FIELD

The present disclosure relates to an apparatus, a system, and a communication method.

BACKGROUND ART

In recent years, living home appliances (also referred to "apparatuses") may come in the form of operating under the control of a home-appliance control cloud (also referred to as a "control cloud") that is a cloud for controlling the apparatuses and to which the apparatuses are connected via networks (see PTL 1).

CITATION LIST

Patent Literature

PTL 1: Japanese Unexamined Patent Application Publication No. 2016-63520

SUMMARY OF THE INVENTION

Technical Problem

It is, however, to be understood that not all users of such apparatuses connect the apparatuses to a control cloud by operations such as making settings for establishing connection to networks. If the apparatuses are not connected to the control cloud, a problem comes up in which it is not possible to realize control of the apparatuses under the control cloud.

In view of this, the present disclosure provides an apparatus and so on that can be appropriately connected to and controlled by a control cloud.

Solutions to Problem

The apparatus according to the present disclosure includes a plurality of wireless communication modules for connecting the apparatus to a server that manages the apparatus, via a plurality of networks different from one another, a storage that stores, for each of the plurality of networks, a characteristic regarding communication via the network, an acquirer that acquires communication information that indicates, for each of the plurality of communication modules, whether communication with the server via the communication modules is possible, an identifier that identifies a specific communication module from among the plurality of communication modules, the specific communication module being indicated by the communication information as being a communication module via which communication is possible, and being selected based on the characteristic, and a controller that causes the specific communication module identified by the identifier to connect to the server to enable communication.

With this configuration, the apparatus can appropriately connect to and communicate with the server via a communication module via which communication with the server is possible and that is selected based on the characteristic regarding communication via a network from the plurality of communication modules included in the apparatus. Accordingly, the apparatus can be appropriately connected to and controlled by the control cloud.

The plurality of communication modules may include a plurality of long-distance communication modules for long-distance wireless communication. Each of the plurality of long-distance communication modules may be associated with a first indicator as the characteristic, the first indicator indicating a degree of stability in communication via the long-distance communication module. The identifier may identify, as the specific communication module, a long-distance communication module associated with the first indicator that indicates a higher degree of stability among the plurality of long-distance communication modules.

With this configuration, the apparatus can communicate with the server via a communication module that provides a higher degree of stability in communication among the plurality of communication modules included in the apparatus. Using more stable communication allows the apparatus to more appropriately connect to the control cloud.

The plurality of communication modules may also include a plurality of long-distance communication modules for long-distance wireless communication. Each of the plurality of long-distance communication modules may be associated with a second indicator as the characteristic, the second indicator indicating a magnitude of a speed of communication via the long-distance communication module. The identifier may identify, as the specific communication module, a long-distance communication module associated with the second indicator that indicates a higher speed among the plurality of long-distance communication modules.

With this configuration, the apparatus can communicate with the server via a communication module that runs at a lower speed among the plurality of communication modules included in the apparatus. In general, lower-speed communication requires a smaller amount of information processing, and thus achieves lower power consumption and a lower cost. Using lower-speed communication allows the apparatus to be more appropriately connected to and controlled by the control cloud while suppressing the amount of information processing and power consumption.

The identifier may calculate a time required to transmit a finite length of data via the specific communication module, and if the time calculated is longer than a threshold value, may identify, as a new specific communication module, a long-distance communication module different from the specific communication module.

With this configuration, in the case where a communication module that runs at a lower speed has been selected from among the plurality of communication modules included in the apparatus, and communication via the communication module is expected to take an excessively long time, the apparatus can prevent such lengthy communication from occurring by again selecting another communication module different from the previous one. Accordingly, the apparatus can be more appropriately connected to and controlled by the control cloud while preventing the occurrence of lengthy communication from occurring.

The plurality of communication modules may include a plurality of communication modules for long-distance wireless communication. Each of the plurality of long-distance communication modules may be associated with a third indicator as the characteristic, the third indicator indicating a cost required for communication via the long-distance communication module. The identifier may identify, as the specific communication module, a long-distance communication module associated with the third indicator that indicates a lower cost among the plurality of long-distance communication modules.

With this configuration, the apparatus can communicate with the server via a communication module that requires a lower cost for communication among the plurality of communication modules included in the apparatus. Using lower-cost communication allows the apparatus to be more appropriately connected to and controlled by the control cloud while suppressing the amount of information processing and power consumption.

The plurality of communication modules may include a long-distance communication module for long-distance wireless communication and a short-distance communication module for short-distance wireless communication. When the communication information indicates that communication via the short-distance communication module is possible, the identifier may identify the short-distance communication module as the specific communication module, irrespective of whether communication with the server via the long-distance communication module is possible.

With this configuration, in the case where the apparatus includes a short-distance communication module, the apparatus can communicate with the server via the short-distance communication module. The short-distance communication module establishes a communication link with a base station (access point) deployed in a home and communicates with the base station, and a communication channel from the base station to the server is assumed to be prepared separately by a user. In this case, relatively high-speed and relatively low-power-consuming communication can be realized in the communication path from the apparatus to the base station. These is a further advantage in that the cost required for communication from the apparatus to the base station is reduced to zero or a relatively small figure. Using relatively high-speed and relatively low-power-consuming communication allows the apparatus to be more appropriately connected to and controlled by the control cloud.

The apparatus may include a plurality of apparatuses installed in one home. Each of the plurality of the apparatuses may include the plurality of communication modules that include a long-distance communication module for long-distance wireless communication and a short-distance communication module for short-distance wireless communication. Except one apparatus among the plurality of apparatuses, the other apparatus may include the identifier that connects directly to the one apparatus via the short-distance communication module of the other apparatus. The one apparatus among the plurality of apparatuses may include the identifier that identifies the long-distance communication module of the one apparatus as the specific communication module and that connects directly to the other apparatus via the short-distance communication module of the one apparatus. The one apparatus among the plurality of apparatuses may further include the controller that relays communication between the long-distance communication module of the one apparatus and the short-distance communication module of the one apparatus.

With this configuration, in the case where there is a plurality of apparatuses in a home, only one apparatus among the plurality of apparatuses communicates with the server via its long-distance communication module, and the other apparatuses connect to the one apparatus via their short-distance communication modules and can communicate with the server by relay of communication via the one apparatus. Accordingly, all of the plurality of apparatuses can communicate with the server while the number of apparatuses that communicate with the server via the long-distance communication module is reduced to one. Using long-distance communication via the one apparatus allows the plurality of apparatuses to be more appropriately connected to and controlled by the control cloud.

The one apparatus among the plurality of apparatuses may be an apparatus that includes a long-distance communication module that provides higher communication quality among the plurality of long-distance communication modules of the plurality of apparatuses.

With this configuration, in the case where only one apparatus among the plurality of apparatuses communicates with the server via its long-distance communication module, this apparatus uses a communication module that provides higher communication quality to communicate with the server. Using long-distance communication via the one apparatus allows the plurality of apparatuses to be connected to and controlled by the control cloud with high quality.

The plurality of communication modules may include a carrier's low-power, wide-area (LPWA) communication module and a non-carrier's LPWA communication module, both serving as long-distance communication modules, and a Wi-Fi communication module serving as a short-distance communication module.

With this configuration, the apparatus can be more readily and more appropriately connected to and controlled by the control cloud via the carrier's LPWA communication module and the non-carrier's LPWA communication module, both serving as long-distance communication modules, and the Wi-Fi communication module serving as a short-distance communication module.

A system according to the present disclosure includes the above-described apparatus and the server that manages the apparatus.

This system achieves the same effects as those of the above-described apparatus.

A communication method according to the present disclosure is a communication method executed by an apparatus. The apparatus includes a plurality of wireless communication modules for connecting the apparatus to a server that manages the apparatus, via a plurality of networks different from one another, and a storage that stores, for each of the plurality of networks, a characteristic regarding communication via the network. The communication method includes acquiring communication information that indicates, for each of the plurality of communication modules, whether communication with the server via the communication module is possible, identifying a specific communication module from among the plurality of communication modules, the specific communication module being indicated by the communication information as being a communication module via which communication is possible, and being selected based on the characteristic, and connecting the specific communication module identified in the identifying to the server to enable communication.

This communication method achieves the same effects as those of the above-described apparatus.

Advantageous Effect of Invention

The apparatus according to the present disclosure can be appropriately connected to and controlled by the control cloud.

BRIEF DESCRIPTION OF DRAWINGS

FIG. 8 is an illustration of three LPWA technologies.

DESCRIPTION OF EXEMPLARY EMBODIMENT

Embodiment

An embodiment will be described hereinafter in detail with reference to the drawings as appropriate. Detailed descriptions more than necessary may be omitted in some cases. For example, detailed descriptions of already well-known matter and redundant descriptions of substantially identical constituent elements may be omitted. This is in order to avoid unnecessary redundancy of the following description and to facilitate the understanding of those skilled in the art.

Note that the inventors provide the accompanying drawings and the following descriptions to help those skilled in the art to better understand the present disclosure, and do not intend to limit the subject matter of claims by these drawings and descriptions.

Hereinafter, the background of the present invention and problems to be solved by the present invention will be described in detail, and then an embodiment will be described.

Background of Present Invention

Figure 1:
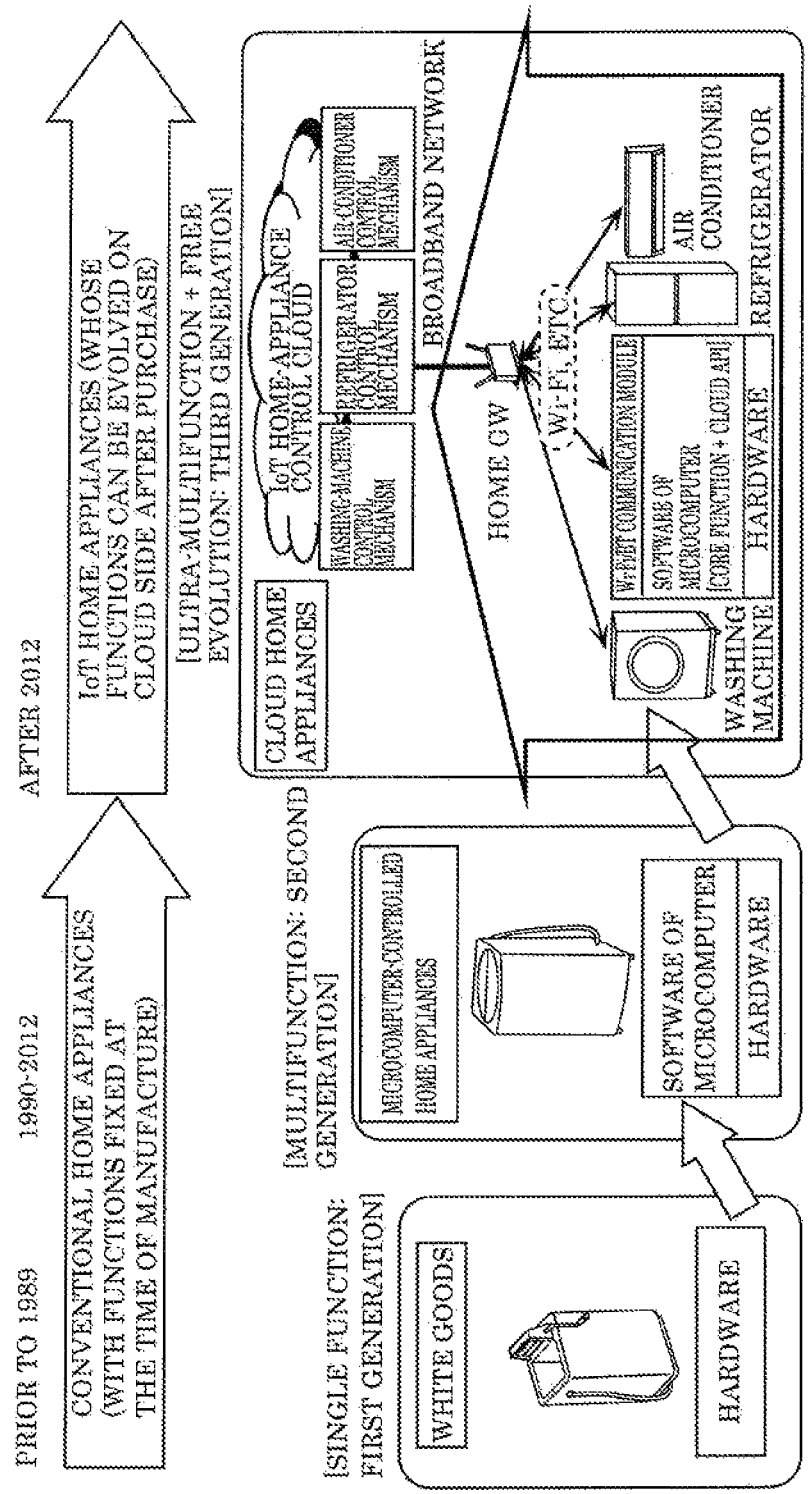
FIG. 1 is an illustration of the evolution of living home appliances.

FIG. 1 is an illustration of the evolution of living home appliances.

The evolution of the architecture of living home appliances (e.g., white goods such as washing machines and refrigerators, air conditioners, and air humidifier cleaners) is illustrated in FIG. 1.

First-generation (1990 or earlier) living home appliances were single-function products because hardware such as compressors and motors was realized by control logics generated by large-scale integrated circuits (LSIs) or the like.

Second-generation (from 1990 to about 2012) living home appliances with built-in microcomputers were multi-function home appliances because complicated control became possible as a result of introduction of microcomputers and creation of software of microcomputers. However, it was not possible to change or add functions by changing microcomputers after shipment.

Third-generation (from 2012 onward) cloud home appliances have communication functions such as Wi-Fi and Bluetooth (registered trademark; hereinafter, referred to as "BT") and have become able to be connected to Internet of Things (IoT) home-appliance control clouds via home gateways (GWs) and broadband networks. Thus, software of microcomputers in the appliances has become able to be updated from the cloud side even after shipment. It also has become possible to add or update functions after shipment by, for example, updating a mechanism for controlling a target appliance on the cloud side, instead of updating software of the microcomputer in the appliance. Here, the IoT home-appliance control clouds refer to clouds (collections of servers and networks) that control home appliances via communication channels such as broadband networks, and are one example of cloud services.

Figure 2:
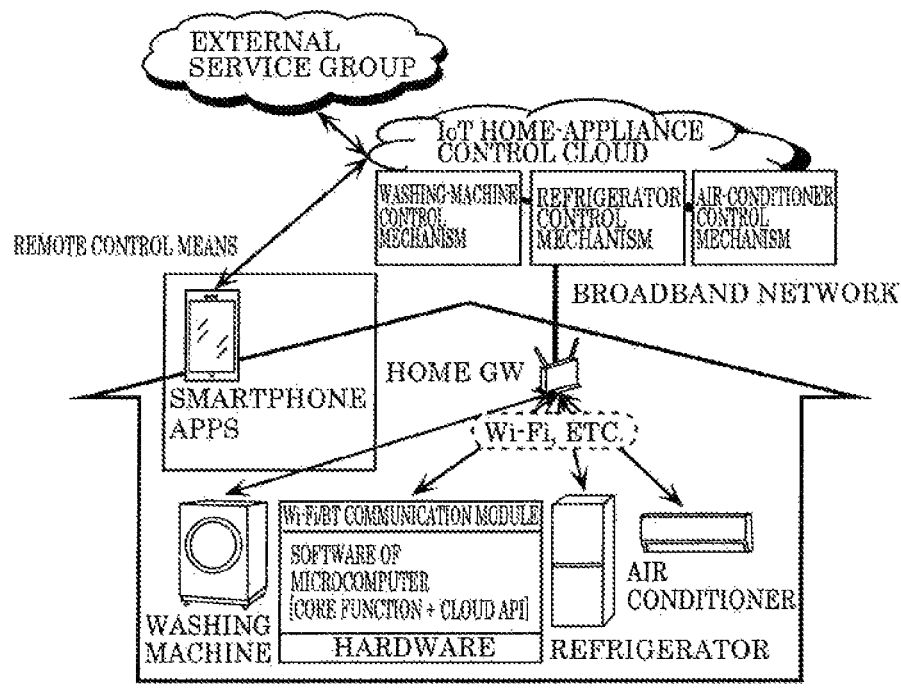
FIG. 2 is an illustration of example linkage between external services and the architecture of third-generation living home appliances.

FIG. 2 is an illustration of linkage between external services and the architecture of third-generation living home appliances.

In the case of third-generation cloud living home appliances (white goods such as washing machines and refrigerators, air conditioners, and humidifiers), each living home appliance in a home can be accessed from applications (APPs) of smartphones via a mechanism for controlling the target home appliance in an IoT home-appliance control cloud.

It is thus possible to remotely monitor the operation status of each living home appliance or remotely control the operation of each living home appliance (e.g., start-up, stop, temperature adjustment, and charging of detergents) from the APPs of smartphones. Besides, linkage between external service groups such as an EC service cloud or a watching service cloud and each living-home-appliance control mechanism in the IoT home-appliance control cloud makes it possible to control a living home appliance from any of various cloud services or to read information (e.g., a log) about the operation of a living home appliance and use this information in external services.

Figure 3:
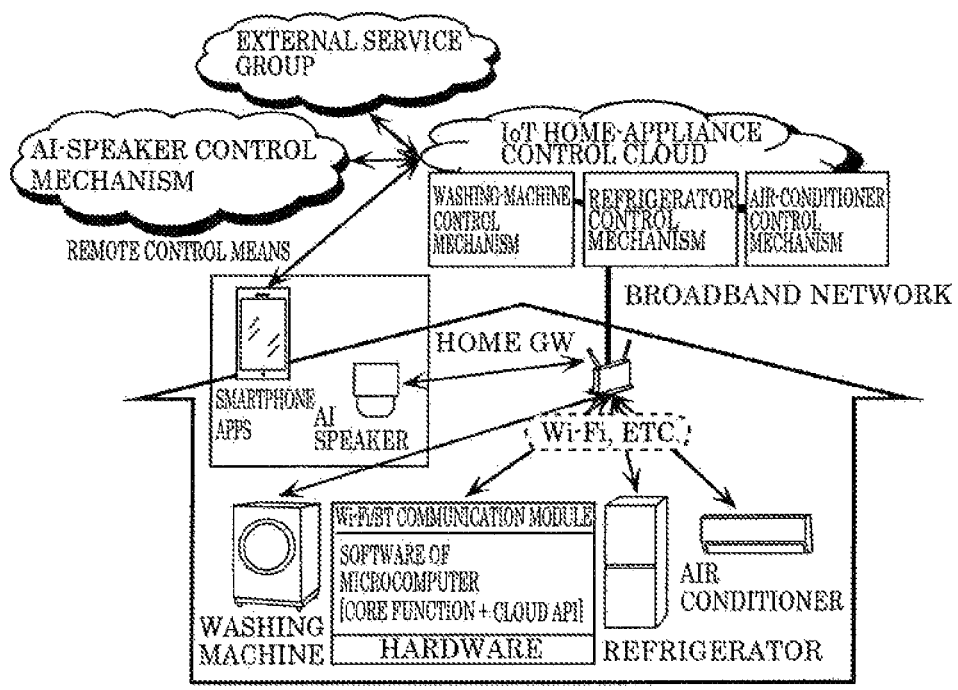
FIG. 3 is an illustration of example linkage between an AI speaker and the architecture of third-generation living home appliances.

FIG. 3 is an illustration of example linkage between an artificial intelligence (AI) speaker and the architecture of third-generation living home appliances.

In the case of third-generation cloud living home appliances (white goods such as washing machines and refrigerators, air conditioners, and humidifiers), an AI speaker that achieves a voice interaction function accesses an AI-speaker control mechanism in a cloud via a home GW, and the AI-speaker control mechanism accesses each living-home-appliance control mechanism. This enables a user to remotely control each living home appliance through voice interaction from the AI speaker.

Problems to be Solved

Figure 4:
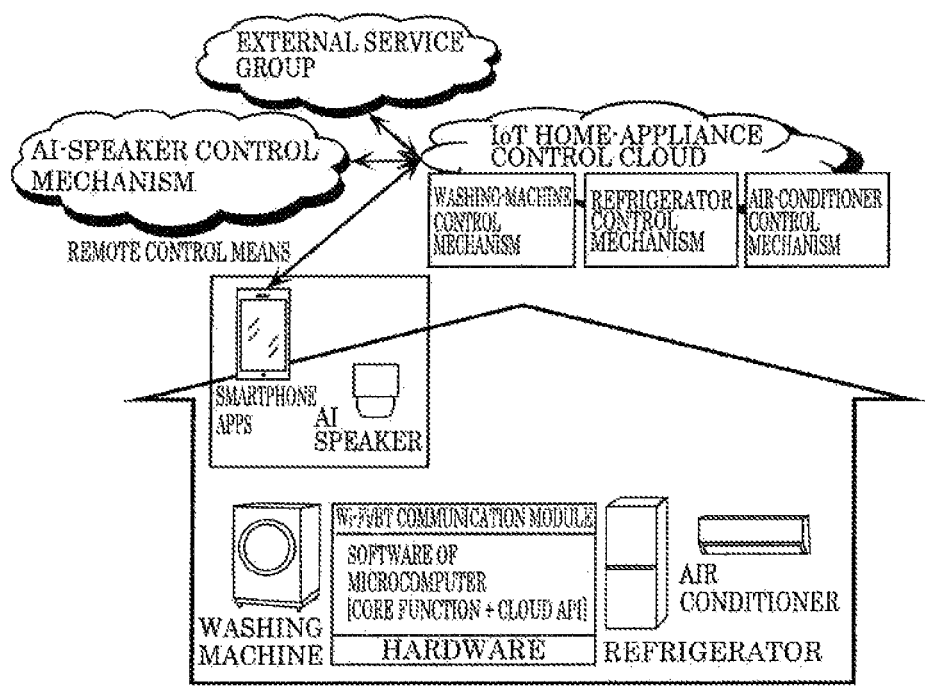
FIG. 4 is an illustration of a first problem with third-generation living home appliances.

FIG. 4 is an illustration of a first problem with the third-generation living home appliances. The first problem is that the functions of third-generation home appliances cannot be used in a home that has no Wi-Fi GW.

Even in the case where a third-generation cloud living home appliance (e.g., white goods such as a washing machine and a refrigerator, an air conditioner, or a humidifier) has been purchased in a household, if the household has no home GWs such as Wi-Fi to establish connection to a broadband network, the cloud home appliance cannot be connected to an IoT home-appliance control cloud. In this case, the IoT home-appliance control cloud cannot access the home appliance and thus cannot achieve its goal raised for the third-generation living home appliances, i.e., improving a product's added value by advancing functions on the cloud side after purchase. Accordingly, the IoT home appliance can be used only as a conventional second-generation living home appliance (microcomputer-controlled living home appliance) whose functions have been fixed at the time of manufacture.

Figure 5:
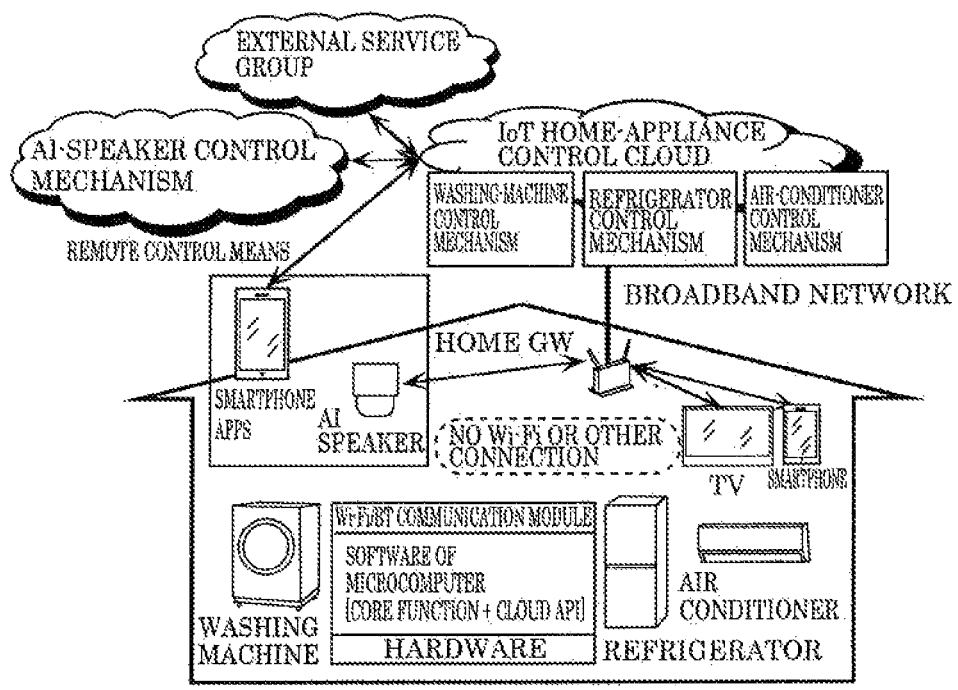
FIG. 5 is an illustration of a second problem with third-generation living home appliances.

FIG. 5 is an illustration of a second problem with third-generation living home appliances. The second problem is that even if there is a Wi-Fi GW in a home, a user may not connect a third-generation living home appliance to the Wi-Fi GW.

If AI speakers or information devices such as smartphones, tablets, and PCs do not have Internet access functions such as Wi-Fi, their essential functions that users require for these devices cannot be used. Besides, some devices such as smartphones (iPhones; registered trademark) or AI speakers cannot be used in the first place if not connected to the Internet and not having user information settings (e.g., an e-mail address and an account). Since users have purchased these devices with a desire to use these functions, the users certainly make user ID settings or Wi-Fi settings to connect the devices to the Internet.

In the case of smart TVs as well, due to the proliferation of video distribution services such as YouTube, Netflix, or Amazon Prime Video, users (or middlemen) often make Wi-Fi settings in order to view these video contents on large-screen TVs.

In the case of cloud living home appliances, however, users often do not make Internet access settings from the beginning because of the users having difficulty in understanding Internet services that become available through cumbersome Wi-Fi settings, or because of the users assuming that the utility value provided by these Internet services are unnecessary.

As other alternatives, in the case where users have made Wi-Fi settings immediately after purchase but has considered that Internet services are not relatively convenient, they often disconnect the established connections or they do not re-establish the connections even in the event of disconnection for some reason.

In the case of information devices and AI speakers, almost 100% of them are expected to connect to the Internet, and therefore it is possible to develop various cloud services, assuming this connection as a precondition. However, in the case of TVs or living home appliances, 100% connection can almost never be expected.

Figure 6:
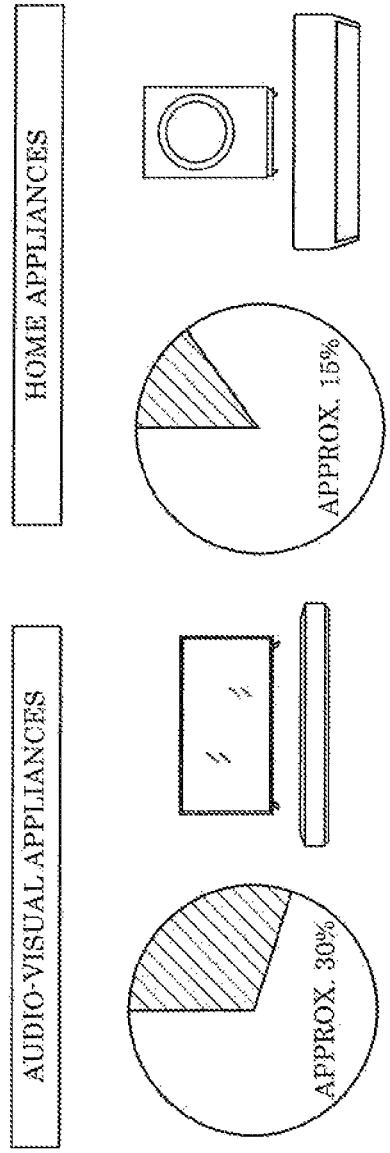
FIG. 6 is an illustration of the percentages of connection of home appliances having built-in network connection functions to networks.

FIG. 6 is an illustration of the percentage of connection of home appliances (AVs and living home appliances) having built-in network connection functions to networks.

As a result of including communication means such as Wi-Fi or Bluetooth, the aforementioned cloud living home appliances can establish connection to an IoT home-appliance control cloud and use various cloud services, thereby providing customers with values that are not available from microcomputer-controlled living home appliances. Thus, customer satisfaction can be improved by providing customers with values that exceed an increase in cost caused by including communication means such as Wi-Fi in the cloud living home appliances.

However, the aforementioned communication means has the problem that in many cases as described below, users of apparatuses do not make settings, i.e., the problem that if cloud living home appliances are not connected to clouds, only the same values as those of microcomputer-controlled living home appliances are provided to customers.

(1) In order to establish Wi-Fi connection, a user needs to prepare a Wi-Fi access point in his/her home. However, some users who use only their smartphones to connect to the Internet, i.e., users who use only communication networks provided by communication carriers, may not possess Wi-Fi access points in their homes.

(2) Even if Wi-Fi access points exist in homes, it cannot be said that everyone is able to easily make settings for establishing Wi-Fi connection, due to complexity in settings for connecting home appliances, such as a connection operation including Wi-Fi password input.

In actuality, the percentage of connection of cloud-compatible TVs or cloud living home appliances to networks in the Japanese market in 2017 remains 50% or less as illustrated in FIG. 6. This indicates that many users use cloud living home appliances as microcomputer-controlled living home appliances.

Figure 7:
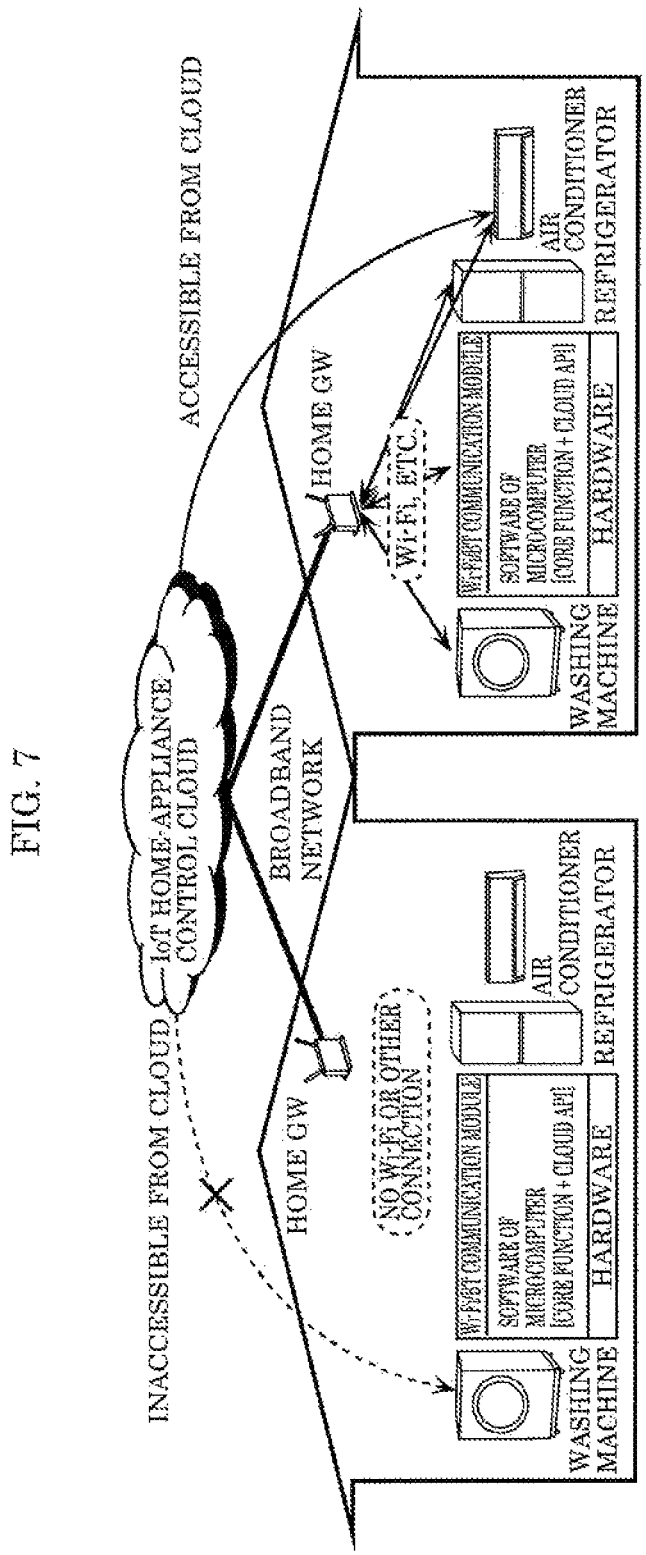
FIG. 7 is an illustration of, for example, connection of cloud living home appliances to a network.

FIG. 7 is an illustration of, for example, connection of cloud living home appliances to a network.

In the case where cloud living home appliances are not connected to an IoT home-appliance control cloud, the cloud cannot access the cloud living home appliances. Thus, users are unable to use functions feasible by the cloud living home appliances, i.e., functions of improving products' added values by advancing functions on the cloud side after purchase.

Accordingly, despite having cloud living home appliances, users can only use functions of the appliances equivalent to those of conventional microcomputer-controlled living home appliances whose functions have been fixed at the time of manufacture.

In the event of a recall or other incidents, original cloud living home appliances can take countermeasures such as issuing an emergency shutdown instruction to a target home appliance, updating remote firmware, or notifying users by email. However, under current circumstances where the percentage of connection is low, manufactures often cannot use the function of controlling cloud living home appliances from IoT home-appliance control clouds for those appliances. For this reason, functions such as remote monitoring and remote maintenance or recall notification, which is feasible under controllable conditions, do not work sufficiently on all targeted cloud living home appliances.

In view of this, various types of communication means are becoming available for IoT-connecting apparatuses or sensors other than home appliances under a situation in which cloud living home appliances including communication means such as Wi-Fi or BT are, in actuality, not likely to be connected to clouds.

In particular, wireless communication means developed for specialized use in IoT and collectively called low-power wide-area (LPWA) have come into practice use and is gathering attention as communication systems suited to the IoT age.

As compared to long-term evolution (LTE) technology, LPWA wireless technology is characterized by reducing terminal cost through installation of small-scale semiconductors and reducing the number of base stations through low-rate modulation that provides fairly long communication distances (up to 10 km), thereby achieving cost reductions in both wireless circuits and infrastructural facilities. Conversely, LPWA can transmit only small amounts of data because it uses a technique to improve receiving sensitivity by lowering transmission rates.

Equipping home appliances with the LPWA wireless technology eliminates the need for users to make contracts for Internet networks, and raises the possibility that the home appliances connect directly to base stations and provide services connected to cloud servers at extremely low cost.

LPWA is classified into cellular LPWA and non-cellular LPWA. Cellular LPWA uses frequency bands (licensed bands) allocated for cellular carriers and provides one example of cellular networks (e.g., LTE).

Non-cellular LPWA uses non-licensed bands existing for individual countries and employs LPWA wireless technology by making use of the fact that the cost of channel usage is unnecessary. Since non-licensed bands are shared with other wireless systems, restrictions for avoiding monopolies on channels are provided by ratio wave methods for individual countries.

Typical LPWA technologies will be described below.

FIG. 8 is an illustration of three LPWA technologies.

(1) Cellular LPWA (1-1) NB-IoT

NB-IoT derives from the GSM (registered trademark) (2G) technology, applies a low transmission rate and the superiority of an LTE communication sequence, and has specifications specialized for IoT data transmission. By setting channel spacing to be same as that in GSM, i.e., 200 kHz, NB-IoT facilitates the operation of substitution into GSM channels. NB-IoT has improved its sensitivity point by reducing the uplink peak rate to a value as low as 62.5 kbps and by storing and receiving data through multiple repetitions of transmission (64 times). A maximum link budget is as high as 130 dB. According to the specifications, transmit power is suppressed to 100 mW (transmit power for GSM is 2 W). This suppresses peak current and enables operations using only a single cell.

(1-2) LTE-M (CAT-M)

LTE-M is a technology that derives from the LTE (4G) technology and carries out communication using minimum channel spacing (1.4 MHz) for LTE. Since LTE-M is compliant with an LTE slot configuration, it can be operated by mixing its communication slots with conventional LTE communication slots. LTE-M has improved its sensitivity point by reducing the uplink peak rate to a value as low as 1 Mbps and by storing and receiving data through multiple repetitions of transmission. A maximum link budget is 130 dB.

Since the transmission rate is somewhat high, power consumption during battery-powered operation is minimal. Transmit power is 200 mW.

(2) Non-Cellular LPWA (2-1) LoRa

LoRa uses conventional low-power wireless bands (ISM bands), but has improved its receiving sensitivity through ultra-low-rate modulation. Special spread modulation, called LoRa chirp modulation, is used as the method for realizing ultra-low-rate modulation. LoRa chirp modulation is characterized by achieving a low transmission rate of 250 bps and a spread band of 125 kHz, thereby having resistance to interfering noise and high sensitivity. LoRa also provides an improved channel capacity because it is possible to select a plurality of data rates in the same bandwidth and receive these data rates simultaneously in the same channel. A maximum link budget is 149 dB. Transmit power is 20 mW.

LoRa inherits the feature (low power, small current peak) of conventional low-power wireless technologies and can be driven using a single cell for 10 years or can be driven using coin cells.

Specifications have been unified by LoRa Alliance, which has enabled interconnection between carriers.

(2-2) SIGFOX

SIGFOX uses conventional low-power wireless bands (ISM bands), but has improved receiving sensitivity through ultra-low-rate modulation. Narrow-band FSK modulation is used as the method for realizing ultra-low-rate modulation, and a frequency error problem has been overcome by devising digital demodulation processing on the base station side. SIGFOX modulation takes place at a fixed uplink rate of 100 bps and a fixed downlink rate of 600 bps. The influence of inferring noise is avoided through multiple transmissions with different frequencies. The channel capacity is relatively low due to the fixed rates and inability to have simultaneous and multiple receptions. A maximum link budget is 158 dB. Transmit power is 20 mW.

SIGFOX inherits the feature (low power, small current peak) of the conventional low-power wireless technologies and can be driven using a single cell for 10 years or can be driven using coin cells.

SIGFOX has its original specifications and takes the form in which base stations are monopolized by Sigfox only.

Since SIGFOX allows only one-way communication, it is applicable to sensor-based IoT devices, but not suitable for IoT living home appliances.

Embodiment

Apparatuses that can be appropriately connected to and controlled by control clouds will be described hereinafter.

Figure 9:
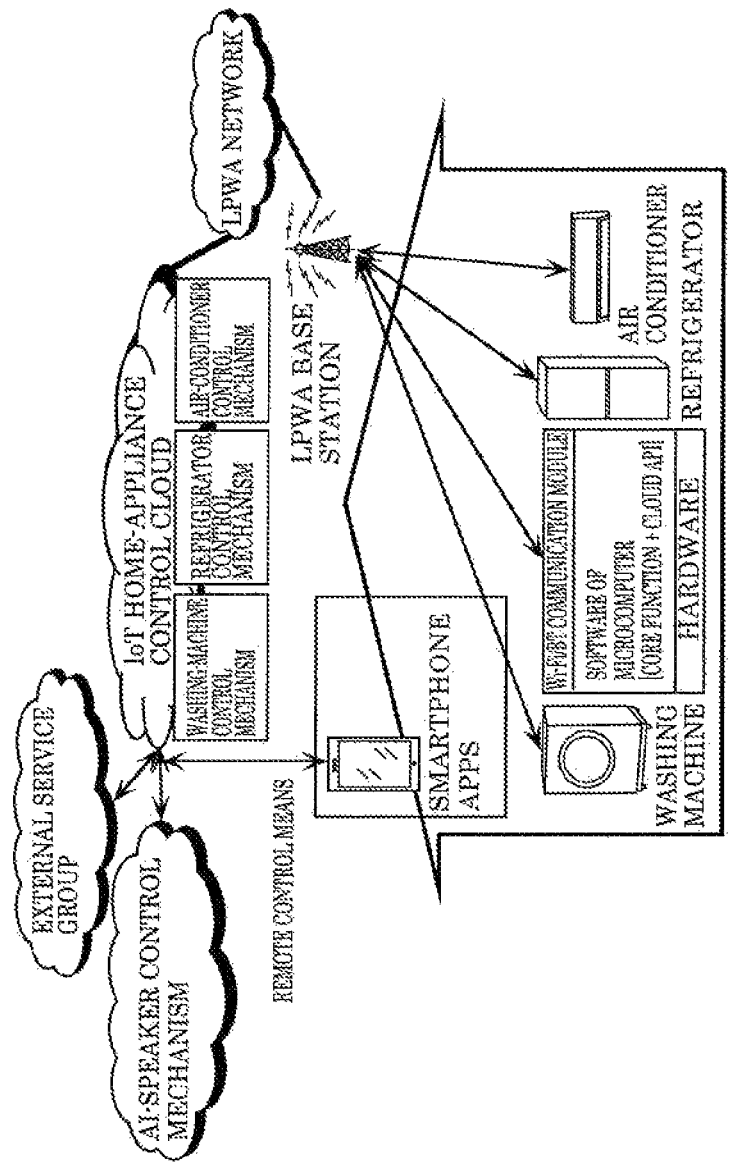
FIG. 9 is a first illustration of linkage between external services and the architecture of fourth-generation living home appliances.

FIG. 9 is a first illustration of linkage between external services and the architecture of fourth-generation living home appliances (continuously accessible IoT home appliances). The living home appliances are, for example, white goods such as a washing machine and a refrigerator, an air conditioner, and a humidifier, and are also simply referred to as "apparatus".

In order to solve the problems with the third-generation living home appliances, the followings are necessary: all users of living home appliances need to have a Wi-Fi GW; development has to be conducted on services that make users want to connect their living home appliances to the Internet and use the appliances continuously; and Wi-Fi settings have to be made simple.

However, due to an upsurge of various communication means in recent years, communication means that allows home appliances to connect to clouds much easier than conventional technologies, collectively called low-power wide-area (LPWA), has been proposed and is receiving attention.

LPWA is characterized by enabling users to use it without settings, achieving very long communication distances (up to 10 km), and connecting to every base station within the reach of radio waves.

Using LPWA for fourth-generation living home appliances (continuously accessible IoT home appliances) allows users to connect the appliances to clouds without preparing a Wi-Fi GW and making troublesome Wi-Fi settings, and makes it possible to achieve function expansion or other optimizations on the cloud side after purchase.

Figure 10:
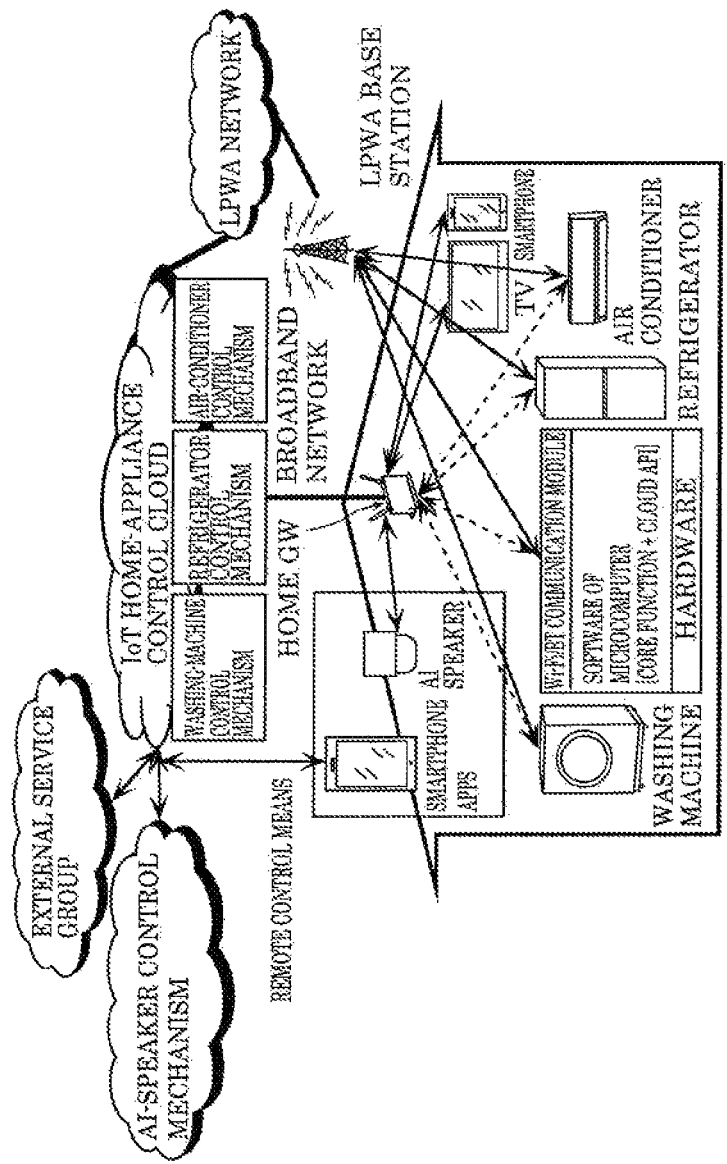
FIG. 10 is a second illustration of linkage between external services and the architecture of fourth-generation living home appliance.

FIG. 10 is a second illustration of linkage between external services and the architecture of fourth-generation living home appliances (continuously accessible IoT home appliances).

LPWA has excellent features as described above, but the amount of data that can be transmitted via LPWA is smaller than that that via Wi-Fi or LTE because LPWA employs a technique for improving receiving sensitivity by reducing the transmission rate. Thus, the fourth-generation living home appliances (continuously accessible IoT home appliances) not only uses LPWA but also uses Wi-Fi, like the third-generation living home appliances, to enable appropriate communication depending on the application.

Figure 11:
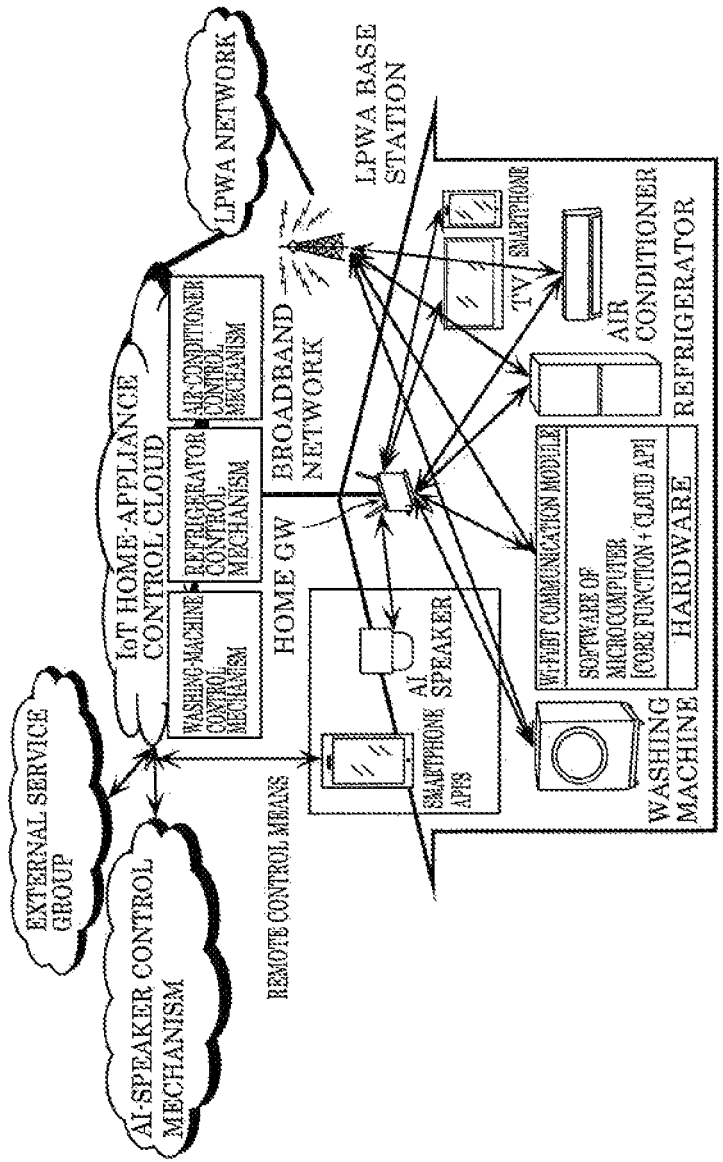
FIG. 11 is a third illustration of linkage between external services and the architecture of fourth-generation living home appliances.

FIG. 11 is a third illustration of linkage between external services and the architecture of fourth-generation living home appliances.

One of the significant problems with the third-generation living home appliances, i.e., forcing users to make troublesome Wi-Fi settings, can be overcome by making use of LPWA for Wi-Fi settings to simplify the settings, as will be described in the following example.

(1) Wi-Fi settings are input to a cloud, and fourth-generation living home appliances (continuously accessible IoT home appliances) use LPWA to acquire Wi-Fi settings from the cloud and establish connection with a Wi-Fi GW.

(2) Wi-Fi settings are input to one fourth-generation living home appliance (continuously accessible IoT home appliance) and transmitted to the other apparatuses in a home via LPWA to allow the other apparatuses to establish connection with the Wi-Fi GW, using this settings.

Figure 12:
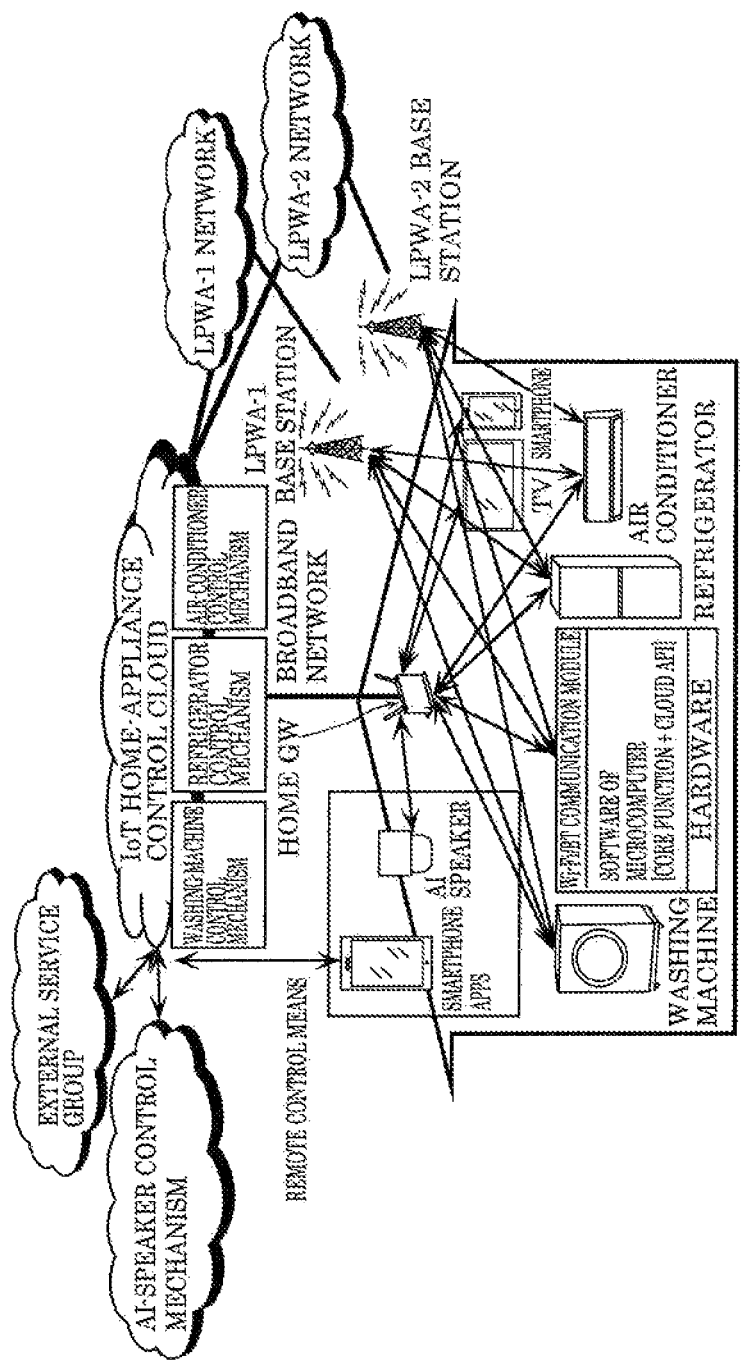
FIG. 12 is a fourth illustration of linkage between external services and the architecture of fourth-generation living home appliances.

FIG. 12 is a fourth illustration of linkage between external services and the architecture of fourth-generation living home appliances.

LPWA can also resolve the problem that only a smaller amount of data can be transmitted via LPWA than via Wi-Fi or other systems as described previously, by providing a plurality of LPWA networks at the same time. LPWA is classified into cellular LPWA and non-cellular LPWA as principle systems. Cellular LPWA, which uses frequency bands (license bands) allocated for cellular carriers, is characterized in that a greater amount of data can be transmitted than via non-cellular LPWA. Non-cellular LPWA, which requires no license and thus even allows home-appliance manufacturers to place base stations on their own, is characterized in that covered areas are more manageable. By providing at least one LPWA in addition to Wi-Fi, it is possible to achieve continuously accessible IoT home appliances that keep connection to the cloud at all times during operation.

Figure 13:
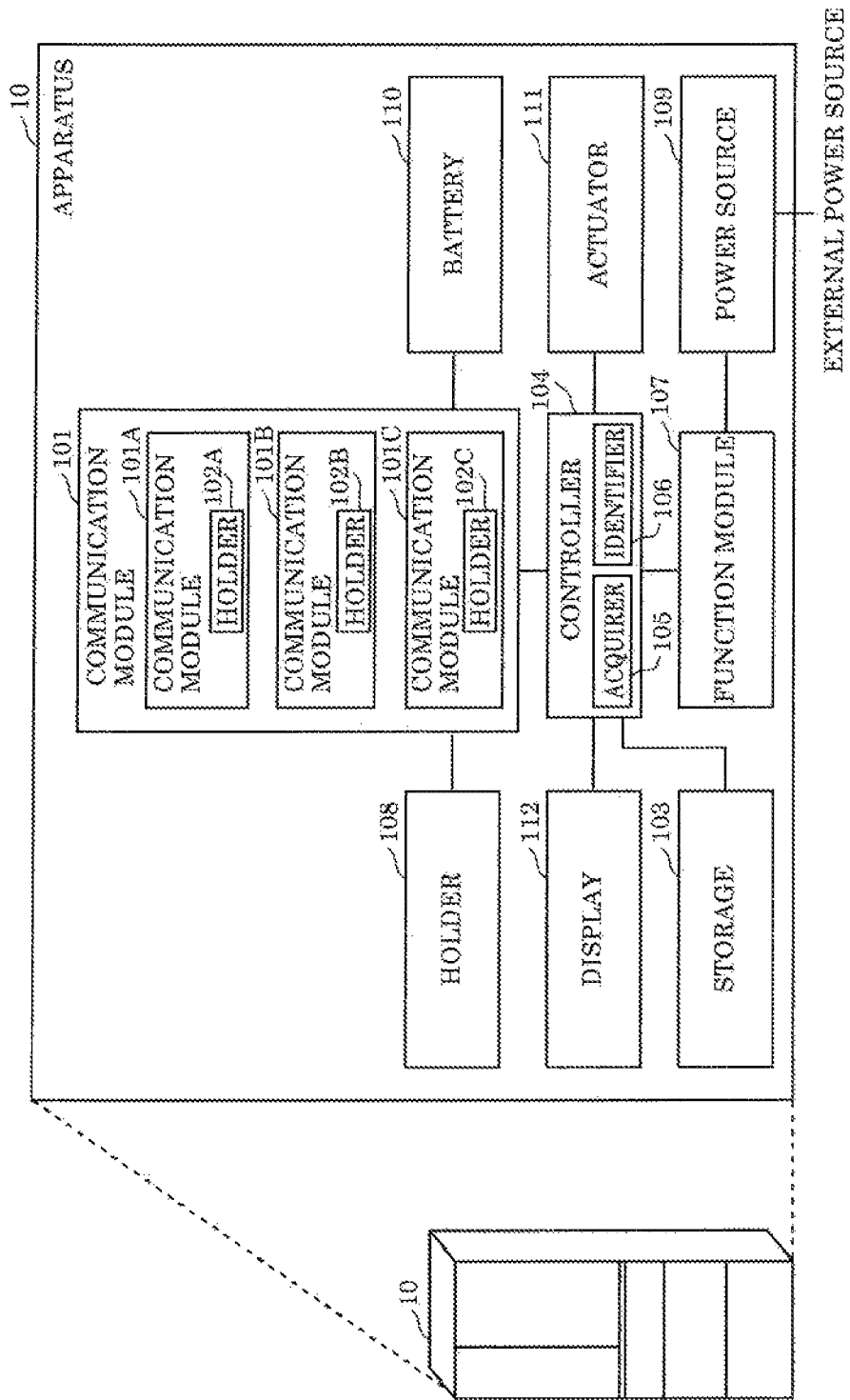
FIG. 13 is a diagram illustrating a configuration of blocks of an IoT home appliance, i.e., an apparatus.

FIG. 13 is a first diagram illustrating a configuration of blocks of apparatus 10 serving as an IoT home appliance.

As illustrated in FIG. 13, apparatus 10 includes communication module 101, storage 103, controller 104, function module 107, holder 108, power source 109, battery 110, operation part 111, and display 112. Controller 104 includes acquirer 105 and identifier 106.

Communication module 101 includes a plurality of wireless communication modules 101A, 101B, and 101C for connecting apparatus 10 to a server that manages apparatus 10 via a plurality of different networks. Communication modules 101A, 101B, and 101C include holders 102A, 102B, and 102C, respectively, each holding a module ID of the corresponding communication module.

Note that bringing communication module 101A or any other module into operation refers to supplying power to the communication module and causing the communication module to perform processing such as processing relating to the transmission and reception of radio waves including transmission and reception frames, processing for generating frames to be transmitted, processing for reading received frames, and processing relating to the establishment of communication connection.

Storage 103 stores, for each of the networks, characteristics regarding communication.

Acquirer 105 acquires communication information that indicates whether communication with the server using each of communication modules 101A, 101B, and 101C is possible.

Identifier 106 identifies a specific communication module from among communication modules 101A, 101B, and 101C, the specific communication module being indicated by the communication information as being a communication module via which communication is possible, and being selected based on the above-described characteristics.

Controller 104 causes the specific communication module identified by identifier 106 to connect to the server so as to enable communication.

Function module 107 is a module that exercises the function of apparatus 10.

Holder 108 is a storage device that holds a unique ID for each apparatus 10.

Power source 109 receives power from an external power source and supplies the power to constituent elements inside apparatus 10.

Battery 110 is a cell that supplies power to, for example, communication module 101. Battery 110 may be a primary battery or may be a secondary battery.

Operation part 111 is an input device that receives a user's operation made to apparatus 10.

Display 112 is a display device that displays various types of information as images.

The configuration of apparatus 10 will be described in detail, using a refrigerator as an example.

Even if connected to a network as an IoT apparatus, apparatus 10 serving as a refrigerator is used as a home appliance and includes various modules for implementing original functions of the home appliance. In the case of the refrigerator, these modules correspond to, for example, a compressor for cooling the inside of the refrigerator, a lighting apparatus that irradiates the inside of the refrigerator when the refrigerator's door is opened, and a sensor for measuring the temperature or humidity inside the refrigerator. These modules correspond to function module 107. In general, large-sized home appliances such as a refrigerator or an air conditioner are configured to connect to an external power source via power source 109.

In home appliances in recent years, it has been common to include controller 104 using a microcomputer or a processor in order to control various convenient functions. For example, a refrigerator with an ice-making function performs operations such as determining the presence or absence of ice with a sensor installed on a special-purpose dish for storing ice and making new ice. To perform such detailed operations, control is exerted by the microcomputer or the processor and software executed by the microcomputer or the processor.

Apparatus 10 further includes display 112 for providing various types of information to the user, and operation part 111 that enables the user to perform complicated operations.

Displays of conventional apparatuses have provided only a minimum display, such as a display indicating abnormal conditions or a display indicating the presence or absence of the passage of current, by a limited method such as using a plurality of lamps or a several-digit number for display. The displays have also performed simple operations such as providing a quick-freezing instruction or performing a reset operation under abnormal conditions, with use of only several buttons.

In contrast, apparatus 10 includes a small-sized touch panel display as operation part 111 and display 112 and enables various settings and display of more complicated conditions.

Apparatus 10 is characterized as an IoT home appliance by communication module 101. Communication module 101 holds communication module IDs by which devices or communication modules 101A, 101B, and 101C can be identified in holders 102A, 102B, and 102C, respectively, and enables connection to the Internet via one of various communication means such as Wi-Fi or LTE or via a plurality of systems. In the case where the apparatus includes a plurality of communication modules, an independent communication module ID is allocated for each communication module and plays a role as a communication identifier such as a telephone number in LTE, for example, depending on the communication system. The connection to the Internet allows the apparatus to transmit various types of information collected by controller 104 to the server, or in contrast, to acquire information necessary for the control of apparatus 10 from the server. In recent years, the technology called LPWA has appeared, which provides a low communication speed, but enables connection to networks with low power consumption. LPWA allows apparatus 10 that includes battery 110 separately from the external power source to carry out minimum communication even if the apparatus is not connected to the external power source. Depending on communication, it may also be necessary to designate a specific home appliance and exert control over this appliance, so that apparatus 10 is assumed to further include holder 108 that holds a unique ID that the apparatus.

Here, communication modules 101A, 101B, and 101C include a plurality of long-distance communication modules for long-distance wireless communication, and each of the long-distance communication modules may be associated with a first indicator that indicates the degree of stability in communication via the long-distance communication module, as the above-described characteristics. Then, identifier 106 identifies, as a specific communication module, a long-distance communication module associated with the first indicator that indicates a higher degree of stability among the plurality of long-distance communication modules.

Each of the long-distance communication modules may be further associated with a second indicator that indicates the magnitude of the speed of communication via the long-distance communication module, as the above-described characteristic. In that case, identifier 106 identifies a long-distance communication module associated with the second indicator that indicates a higher speed among the plurality of long-distance communication modules, as a specific communication module.

Here, identifier 106 may calculate a time required to transmit a finite length of data via the specific communication module, and if the calculated time is longer than a threshold value, may identify a long-distance communication module different from the specific communication module as a new specific communication module.

Each of the long-distance communication modules may be yet further associated with a third indicator that indicates the cost required for communication via the long-distance communication module, as the above-described characteristic. In that case, identifier 106 identifies a long-distance communication module associated with the third indicator that indicates a lower cost among the plurality of long-distance communication modules, as a specific communication module.

Note that communication modules 101A, 101B, and 101C may include a long-distance communication module for long-distance wireless communication and a short-distance communication module for short-distance wireless communication. In that case, if the communication information indicates that communication via a short-distance communication module is possible, identifier 106 identifies a short-distance communication module as a specific communication module, irrespective of whether communication with the server via a long-distance communication module is possible.

In the case where a plurality of apparatuses are installed in one home and a plurality of communication modules included in the plurality of apparatuses each include a long-distance communication module for long-distance wireless communication and a short-distance communication module for short-distance wireless communication, except one apparatus among the plurality of apparatuses, the other apparatuses cause their identifiers 106 to connect directly to the one apparatus via the short-distance communication modules of the other apparatuses. The one apparatus among the plurality of apparatuses causes its identifier 106 to identify the long-distance communication module of the one apparatus as a specific communication module, and connects this long-distance communication module directly to the other apparatuses via the short-distance communication module of the one apparatus. Then, the one apparatus among the plurality of apparatuses causes its controller 104 to relay communication between the long-distance communication module of the one apparatus and the short-distance communication module of the one apparatus.

Note that the one apparatus among the plurality of apparatuses may be an apparatus that includes a long-distance communication module that provides higher communication quality among the long-distance communication modules of the plurality of apparatuses.

Note that communication modules 101A, 101B, and 101C may include a carrier's low-power, wide-area (LPWA) communication module and a non-carrier's LPWA communication module as long-distance communication modules, and a Wi-Fi communication module as a short-distance communication module.

The following is a more detailed description of the operations and processing performed by apparatus 10.

Figure 14:
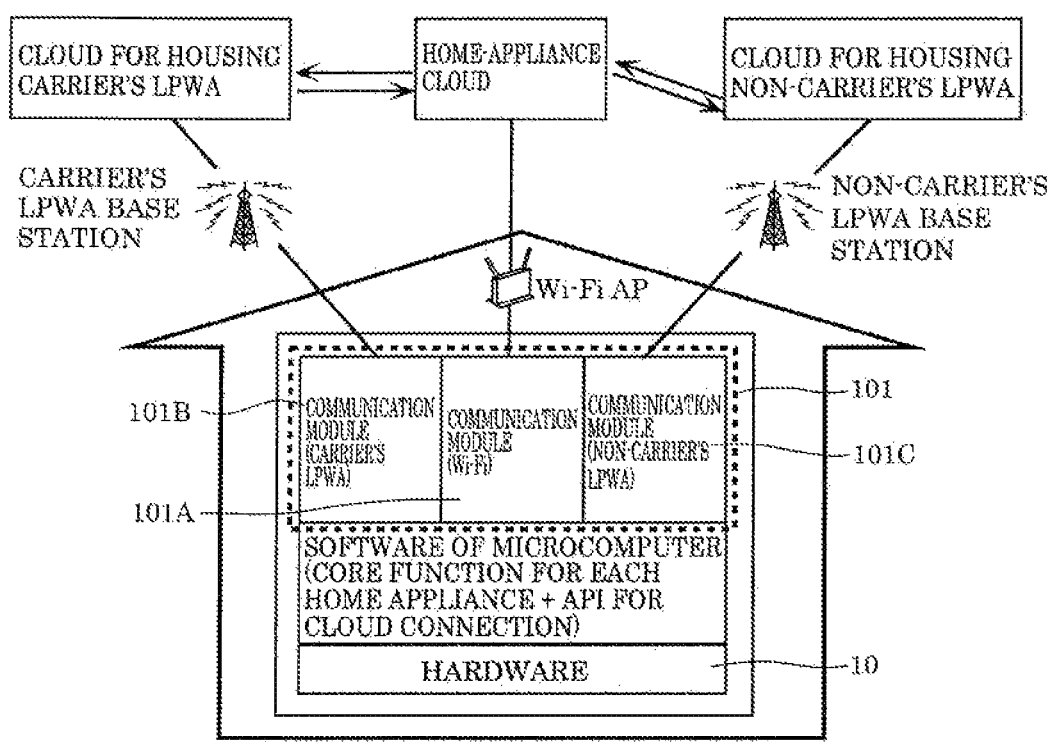
FIG. 14 is an illustration of an apparatus compliant with a plurality of communication systems.

FIG. 14 is an illustration of apparatus 10 compatible with a plurality of communication systems.

In the case of applying various communication systems (e.g., Wi-Fi, Bluetooth, and LPWA) to apparatus 10, there are merits and demerits for each communication system. In view of this, a configuration is proposed in which two or more communication systems are applied to apparatus 10 so as to select an optimum communication system depending on how apparatus 10 is used, environments where apparatus 10 is installed, or applications or services given to apparatus 10.

FIG. 14 is an illustration of apparatus 10 provided with three types of communication modules including Wi-Fi, carrier's LPWA, and non-carrier's LPWA, and clouds that house the respective communication systems. Here, communication module 101A corresponds to the Wi-Fi communication module, communication module 101B corresponds to the carrier's LPWA communication module, and communication module 101C corresponds to the non-carrier communication module. The apparatus may include a larger number of communication systems, or may include two types of communication systems.

In FIG. 14, the "home-appliance cloud" refers to a cloud that is responsible for the management or control of apparatus 10. In any case of the networks via Wi-Fi or LPWA, the home-appliance cloud is responsible for handling information about apparatus 10 and performing control over apparatus 10.

The "cloud for housing carrier's LPWA" refers to a cloud that houses apparatus 10 that is connected to the home-appliance cloud via the carrier LPWA communication module. The information about apparatus 10 (e.g., control information, the status of the home appliance) is transmitted to and received from the home-appliance cloud via the cloud for housing carrier's LPWA.

The "cloud for housing non-carrier's LPWA" refers to a cloud that houses apparatus 10 that is connected to the home-appliance cloud via the non-carrier LPWA communication module. The information about apparatus 10 (e.g., control information, the status of the home appliance) is transmitted to and received from the home-appliance cloud via the cloud for housing non-carrier's LPWA.

The next description is given of which communication system is used by apparatus 10 compliant with a plurality of communication systems.

In the case of transmitting and receiving the status of apparatus 10 or information necessary for control between the apparatus and the home-appliance cloud, the communication system to be used by apparatus 10, which has installed therein various communication systems (Wi-Fi, non-carrier's LPWA such as LoRa, and carrier's LPWA such as NB-IoT), is selected based on the following priorities.

The following priorities are basic ideas, and suitable communication between apparatus 10 and the home-appliance cloud can be achieved by appropriately changing priorities depending on various conditions, which will be described later.

(1) Priority 1: Wi-Fi

In the case where there is already a Wi-Fi access point (AP) in a home where apparatus 10 is installed and apparatus 10 is connected to the AP, apparatus 10 is connected to the Internet, using a wide-area system such as an optical fiber (fiber to the home: FTTH) or an asymmetric digital subscriber line (ADSL). In the case where apparatus 10 is connected to the Internet via Wi-Fi, there are merits such as high data transmission and reception speeds and a short delay in data transmission and reception between apparatus 10 and the home-appliance cloud. In many cases, the user of apparatus 10 already possesses the Internet connection (e.g., FTTH or ADSL) required for connection via Wi-Fi for his/her smartphone or a TV or tablet that receives VoD, and has already been paying a line usage charge for the above purpose. Thus, even if apparatus 10 is additionally connected to Wi-Fi, the line usage charge will not increase.

(2) Priority 2: Non-Carrier's LPWA (e.g., LoRa)

Communication via non-carrier's LPWA, which uses non-licensed radio bands, provides unstable communication line quality, but is inexpensive.

Technologically, non-carrier's LPWA often has constraints on transmit power or constraints on continuous transmission, and there are problems such as low data communication capacity or a long delay due to an unstable reaction rate. On the other hand, the radio bands used by non-carrier's LPWA requires no license as long as the above-described constraints are satisfied, and therefore it is possible for companies that require communication networks to freely construct self-owned networks.

(3) Priority 3: Carrier's LPWA (e.g., NB-IoT, Cat-M1)

Communication via carrier's LPWA, which uses licensed bands allocated for a specific carrier, provides stable communication line quality and thus has higher channel capacity and a smaller amount of delay than non-carrier's LPWA. However, carrier's LPWA requires high cost for communication because their communication modules become complicated in order to control the channel capacity or the amount of delay and because complicated processing is performed on the base station side that houses the communication modules.

The price system varies with each carrier, but the cost of communication and the cost of subscriber identity module (SIM) cards (also simply referred to as "SIMs") are involved in many cases. As to the cost of SIMs, SIMs are integrated circuit (IC) cards or embedded subscriber identity modules (eSIMs), each assigned a unique ID. Communication via carrier's LPWA requires the cost of SIMs. Specifically, the cost of assigning SIMs itself or the cost of turning on or off (enabling or disabling) SIM functions may be involved. The cost of communication is a cost that is proportional to the amount of data transmitted and received during communication via carrier's LPWA.

Note that "turning on a SIM" or "turning on a SIM function" refers to enabling the function of a SIM card, and more specifically, causing a communication module corresponding to that SIM card to start to operate and connecting the apparatus including that SIM card to a network so as to enable communication, using an international mobile subscriber identity (IMSI) described in that SIM card. Also, "turn-off a SIM" or "turn-off a SIM function" refers to disabling the function of a SIM card, and more specifically, stopping the operation of the communication module corresponding to that SIM card and disconnecting the apparatus including that SIM card from the network.

The cost of turning on/off SIMs will be described in detail below.

In the case of using carrier's LPWA, there is no need on the service side using LPWA to consider the quality of LPWA because communication quality is stable. However, too much use of communication via carrier's LPWA will cost too much, so that only services that can recoup communication costs from end users can hold good.

For this reason, it is preferable to use non-carrier's LPWA, which provides unstable quality but is inexpensive, by combination with carrier's LPWA in consideration of the contents of services, time periods, the conditions of bands, or other factors. In this case, it is necessary to devise how to use lines in accordance with the way of thinking about communication costs, and communication costs are considered as in the following (1) to (4).

(1) As communication costs, a fixed communication fee may have to be paid based on the number of SIM cards. In this case, conceivable ways of counting the "number of SIMs that enable communication" are as follows:

(a) a maximum number of SIMs capable of operating at the same time for each time period (relatively long time period) such as a month, a week, a day, or an hour; and (b) a maximum number of SIMs capable of operating at the same time for each very short time period (relatively short time period) such as one second.

Here, the number of SIMs may be determined based also on area parameters (e.g., the coverage of a carrier's LPWA base station), in addition to the settings of time periods as described above in (a) and (b). The allocation of SIMs may be determined depending on the characteristics of each apparatus 10 (the frequency of occurrence of communication, the amount of data generated). For example, no SIMs are allocated for apparatus 10 that simply notifies the home-appliance cloud of whether it operates once in a day, and SIMs may be allocated with priority for apparatus 10 that transmits more detailed data about apparatus 10 (e.g., temperature/humidity sensors of an air conditioner per second).

(2) Communication costs may be charged, not based on the number of SIMs, but based on the total amount of data transmitted through communication lines.

(3) Communication costs may be charged based on the number of times SIMs are turned on/off.

This requires that it is possible to turn on/off SIMs in apparatus 10 from the could system for users. Instead of the above, apparatus 10 may become able to turn on/off SIMs as necessary. This turning-on/off of SIMs is considered to involve a little cost.

(4) As to communication costs, there may be an upper limit on the number of times SIMs can be turned on/off for each terminal or for each fixed time period for all terminals of a contractor.

Next, how to select a communication system will be described.

(1) In the Case of Billing System Based on the Number of SIMs that Enable Communication In the case where there is no Wi-Fi access point (AP) in the place where apparatus 10 has been installed, or in the case where there is an access point, but Wi-Fi connection settings are not made for apparatus 10 due to the inconvenience of operation of connecting apparatus 10 to the Wi-Fi access point becoming a barrier, non-carrier's LPWA and carrier's LPWA are switched and used in order to achieve communication between apparatus 10 and the home-appliance cloud. This strikes a balance between costs required for communication and comfortability (e.g., response of apparatus 10 or applications) of the user who operates apparatus 10 or a smartphone application relating to apparatus 10.

As the first case, the following case is considered in which, as a billing system based on SIMs used in carrier's LPWA, a fixed communication charge has to be paid based on the number of SIMs that enable communication, and a maximum number of SIMs capable of operation is fixed for each fixed period such as a month, a week, a day, or an hour.

As the method for fixing the maximum number of SIMs in the above-described predetermined time period, it is, for example, conceivable that a maximum number of SIMs to be turned on in each time period is set based on the number of apparatuses 10 that are assumed to operate in each time period.

A small number of SIMs is allocated for daytime hours on weekdays (i.e., time periods during which not many apparatuses 10 are operating due to many two-earner households).

(b) A great number of SIMs is allocated for nighttime hours on weekdays (i.e., relatively many apparatuses 10 are operating).

(c) A great number of SIMs is allocated for weekends (many apparatuses 10 are operating).

It is conceivable that these operating conditions in each time period can be calculated based on the operating conditions of apparatuses 10 in the past same time period.

Alternatively, the number of SIMs may be changed, not only depending on the past operating conditions, but also depending on parameters that affect the operations of apparatuses 10, such as a season during operation, the weather, and the type of each apparatus 10.

For example, in the case where there is a known tendency of users to use washing machines more in the summer, a greater number of SIMs may be allocated to washing machines on weekends in the summer than on weekends in the winter.

In this way, by using the past operating conditions of apparatuses 10 and other factors (e.g., the weather) that affect the operating conditions of apparatuses 10, it is possible to favorably set a maximum number of SIMs capable of operation and to thereby minimize costs required for the number of SIMs that enable communication.

Next is a description of how to switch the communication system in apparatus 10 in the aforementioned billing system. Here, each communication path is based on the following assumption.

Carrier's LPWA is ON (SIM is ON) and enables communication during predetermined time periods, whereas it is OFF (SIM is OFF) and disables communication (disables data transmission and reception) during time periods other than the predetermined time periods.

Wi-Fi enables communication when connection settings have been made.

Non-carrier's LPWA always enables communication and is either free of charge or much more inexpensive than carrier's LPWA even if costs are charged based on the volume of communication.

Figures 15, 16:
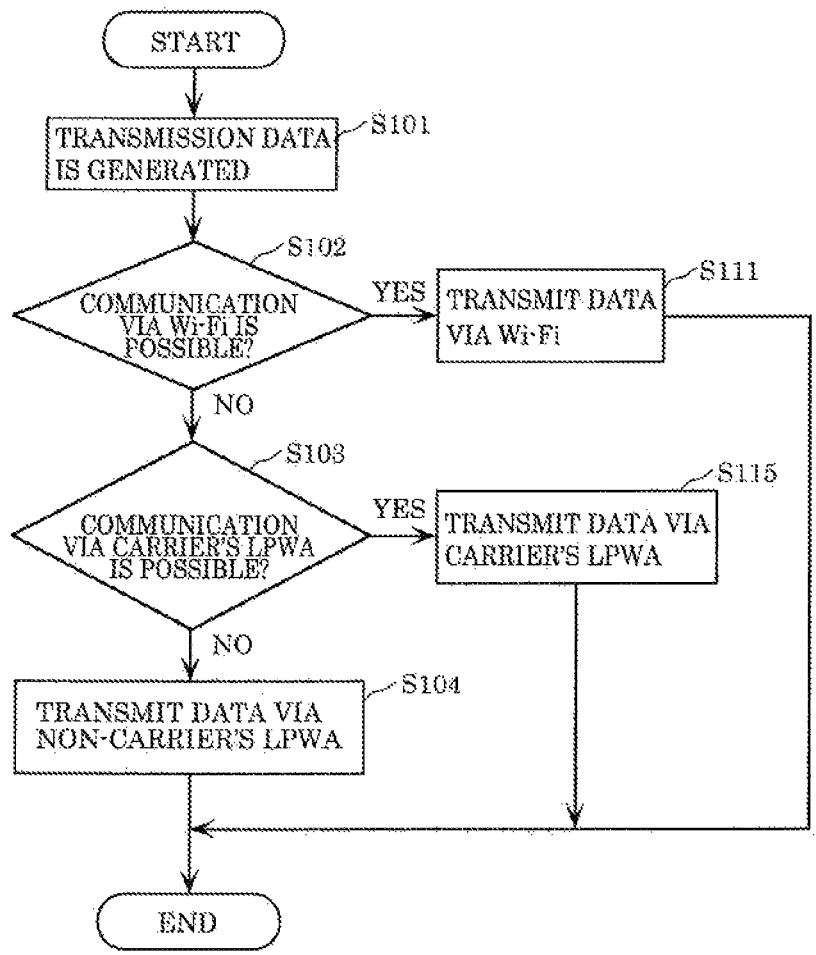
FIG. 15 is a flowchart of a first example of how to select a communication system when Wi-Fi connection is not possible.
FIG. 16 is an illustration of the number of SIM cards available for each predetermined time period.

FIG. 15 is a flowchart illustrating a first example of how to select a communication system when Wi-Fi connection is not possible. FIG. 15 is a flowchart illustrating which communication system is used to transmit data when apparatus 10 has generated data to be transmitted to the home-appliance cloud. Note that processing for carrying out communication via a communication module that has a higher first indicator, i.e., a higher degree of communication stability, among a plurality of long-distance communication modules included in apparatus 10 is illustrated in FIG. 15. In the case where apparatus 10 includes a short-distance communication module and communication via the short-distance communication module is possible, processing for carrying out communication via the short-distance communication module is illustrated.

As illustrated in FIG. 15, when transmission data has been generated (step S101), apparatus 10 determines whether communication via Wi-Fi is possible (step S102). Apparatus 10 stores the result of the determination as communication information.

If having determined that communication via Wi-Fi is not possible (No in step S102), apparatus 10 further determines whether communication via carrier's LPWA is possible (step S103). Apparatus 10 stores the result of the determination as communication information.

If having determined that communication via carrier's LPWA is not possible (No in step S103), apparatus 10 transmits the data via non-carrier's LPWA (step S104).

If having determined that communication via Wi-Fi is possible (Yes in step S102), apparatus 10 transmits the data via Wi-Fi (step S111).

If having determined that communication via carrier's LPWA is possible (Yes in step S103), apparatus 10 transmits the data via carrier's LPWA (step S115).

Although not illustrated in the flowchart in FIG. 15, in the case where an expiration time of communication via carrier's LPWA has arrived during data transmission via carrier's LPWA, (a) the expiration time of SIMs may be extended (e.g. an expiration time of communication that is currently 15:00 is extended until completion of the data transmission or to a predetermined time such as 15:05), or (b) the procedure may return to the step of determining "whether communication via Wi-Fi is possible" in the flowchart to again confirm a communication path that enables communication and to transmit the remaining data via Wi-Fi or non-carrier's LPWA.

In this way, in the case where communication costs are charged based on the number of SIMs that can be used in each predetermined time period, carrier's LPWA is used as long as it enables communication. This avoids the use of non-carrier's LPWA, which provides a low communication speed, as much as possible and enables communication to be carried out at the same cost (with the same number of effective SIMs allocated) and at a higher communication speed.

Whether to extend the time period during which the aforementioned SIMs are in the ON state may be inquired of the cloud for housing carrier's LPWA, or the extent to which the time period can be extended may be determined in advance for each apparatus or for each time period.

Note that the determination as to "whether communication via carrier's LPWA is possible" in the flowchart may be made depending on the ON/OFF states of the SIMs used in carrier's LPWA. As another alternative, whether all the SIMs available within a predetermined time period have been utilized may be inquired of the home-appliance cloud or the cloud for housing carrier's LPWA, and if all the SIMs have not yet been utilized, the apparatus may determine that communication via carrier's LPWA is made possible by turning SIMs on.

Apparatus 10 may use the table as illustrated in FIG. 16 to turn on/off SIMs. The above table, including time-period breaks and the number of SIMs, may be updated according to the past operating conditions of apparatuses 10 grasped by the home-appliance cloud.

Next, a method of minimizing the number of SIMs to be turned on in a home will be described. As in the aforementioned billing system, a case is considered in which costs are charged based on the number of SIMs that are operating at the same time.

Figure 17:
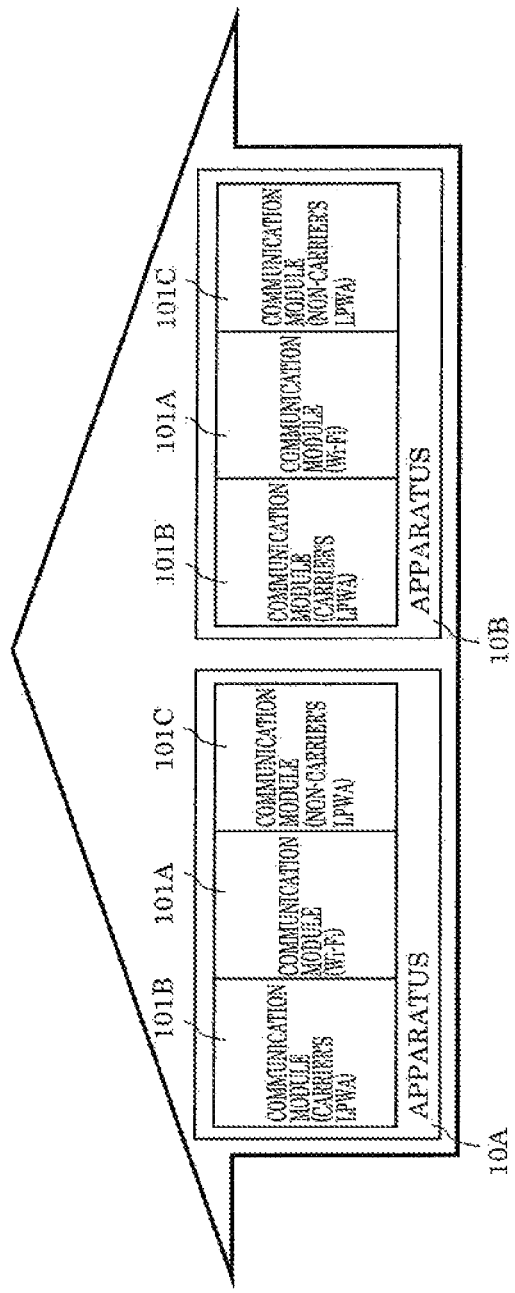
FIG. 17 is a first illustration of a configuration for minimizing the number of SIM cards to be used in a home.

For example, a case is considered in which there are two apparatuses 10A and 10B in one home, and each of apparatuses 10A and 10B includes a carrier's LPWA communication module, a Wi-Fi communication module, and a non-carrier's LPWA communication module, as illustrated in FIG. 17. For example, apparatus 10A has an apparatus ID of 0001, and apparatus 10B has an apparatus ID of 0002.

At this time, if both of apparatuses 10A and 10B enable communication via carrier's LPWA (SIMs are turned on), fees are charged for two SIMs. The method of avoiding charging fees for two SIMs will be described. The following description is given, assuming the following conditions.

(a) Both apparatuses 10A and 10B do not connect to the home-appliance cloud via Wi-Fi (if they connect to the home-appliance cloud via Wi-Fi, there is no need to use LPWA).

(b) Apparatus 10A enables communication via carrier's LPWA (SIM is ON), whereas apparatus 10B disables communication via carrier's LPWA (SIM is OFF).

(c) Both apparatuses 10A and 10B enable communication via non-carrier's LPWA At this time, in the case where apparatus 10B wants to transmit data to the home-appliance cloud, generally non-carrier's LPWA is used to transmit the data at a very low speed, or in the case where the communication speed of non-carrier's LPWA is too low and cannot be used, there is only one way to turn on the SIM in apparatus 10B and use carrier's LPWA.

While apparatuses 10A and 10B both have a communication function using Wi-Fi, one of the functions of Wi-Fi is establishing direct connection between two apparatuses, i.e., connection called ad-hoc mode connection.

Figure 18:
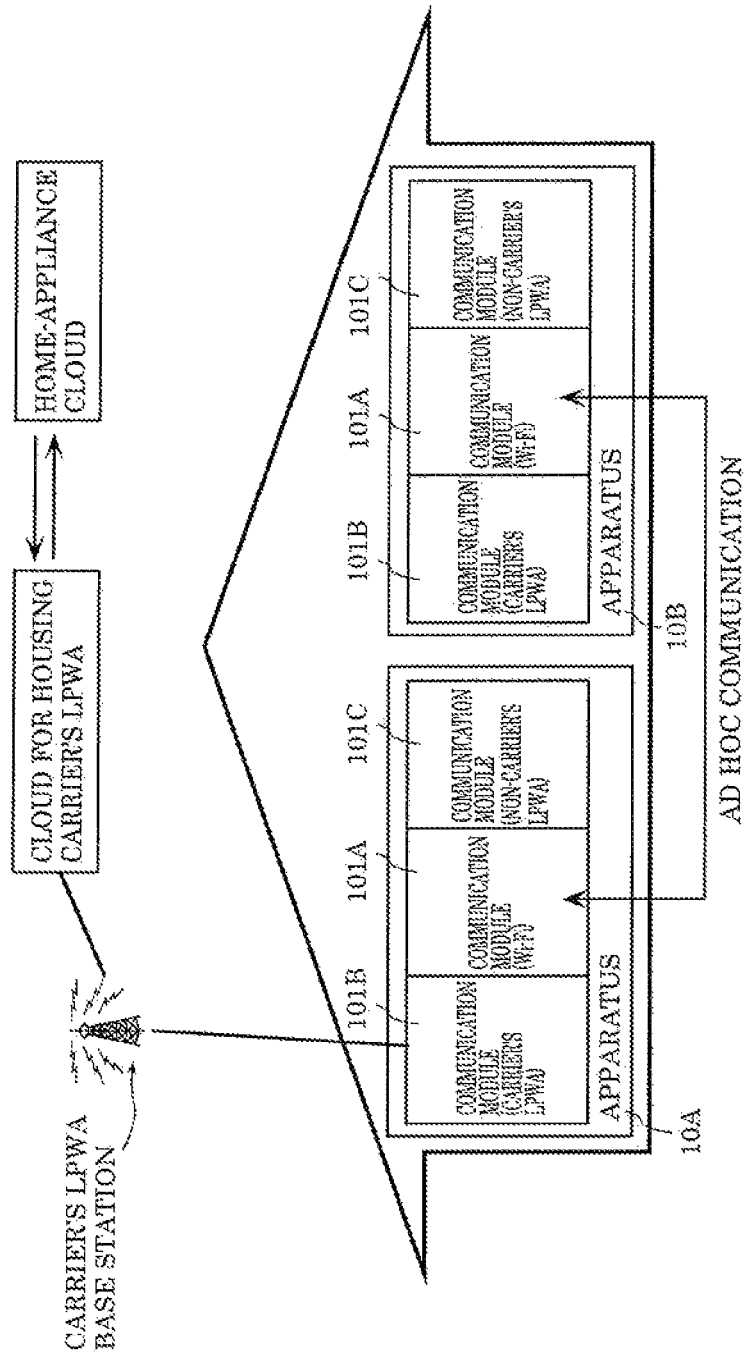
FIG. 18 is a second illustration of a configuration for minimizing the number of SIM cards to be used in a home.

FIG. 18 is a second illustration of a configuration for minimizing the number of SIM cards to be used in a home. As illustrated in FIG. 18, ad-hoc mode connection between apparatuses 10A and 10B can be realized by causing apparatuses 10A and 10B to have the same three values for Wi-Fi: (1) an ESSID (SSID); (2) a wireless channel; and (3) WEP (encrypted key). In this way, connecting apparatuses 10A and 10B using the Wi-Fi ad-hoc mode allows apparatus 10B to become able to connect to the home-appliance cloud via apparatus 10A. This form of connection requires only one SIM to be turned on, thus reducing the cost proportional to the number of SIMs to be turned on.

Figure 19:
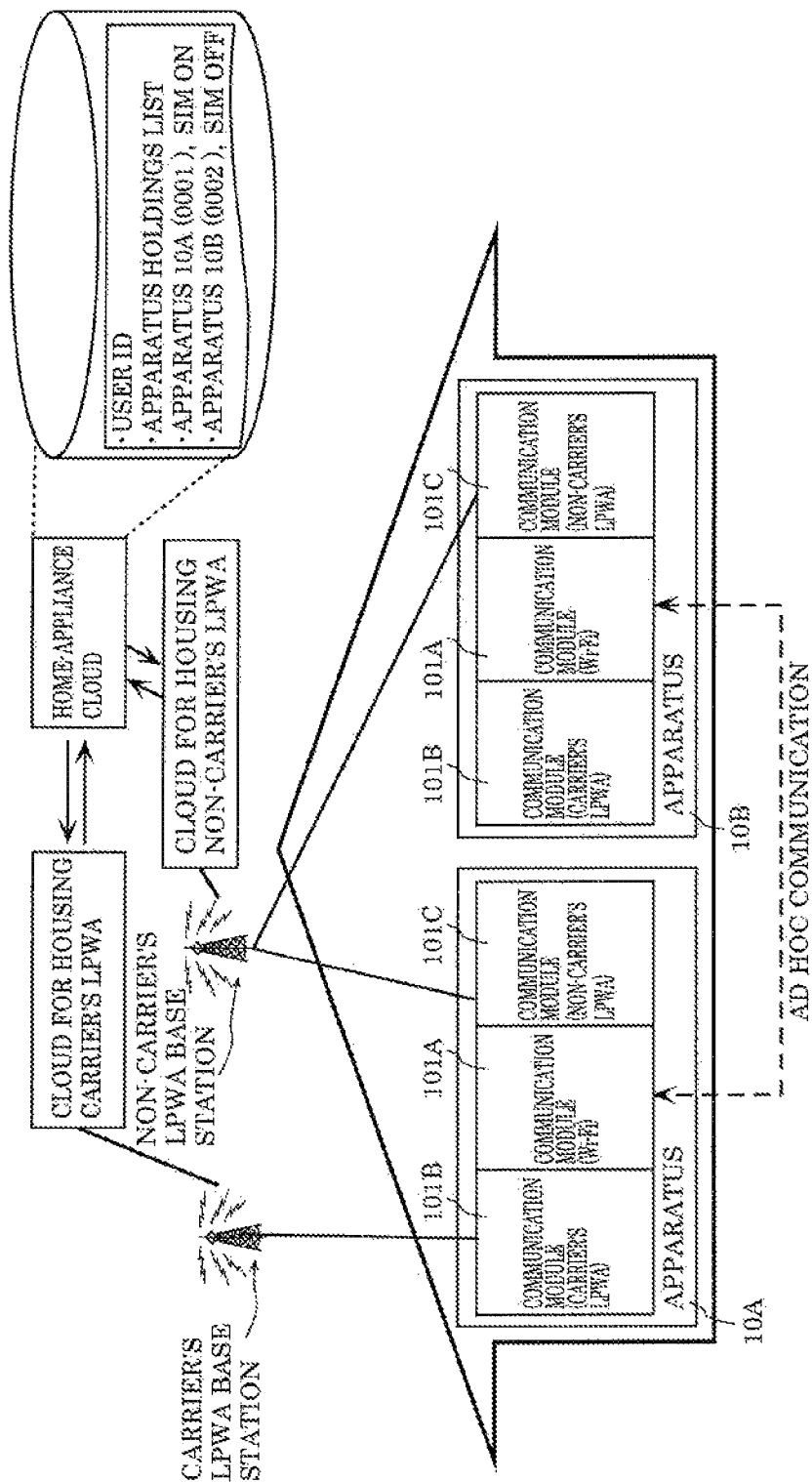
FIG. 19 is a third illustration of a configuration for minimizing the number of SIM cards to be used in a home.
Figure 20:
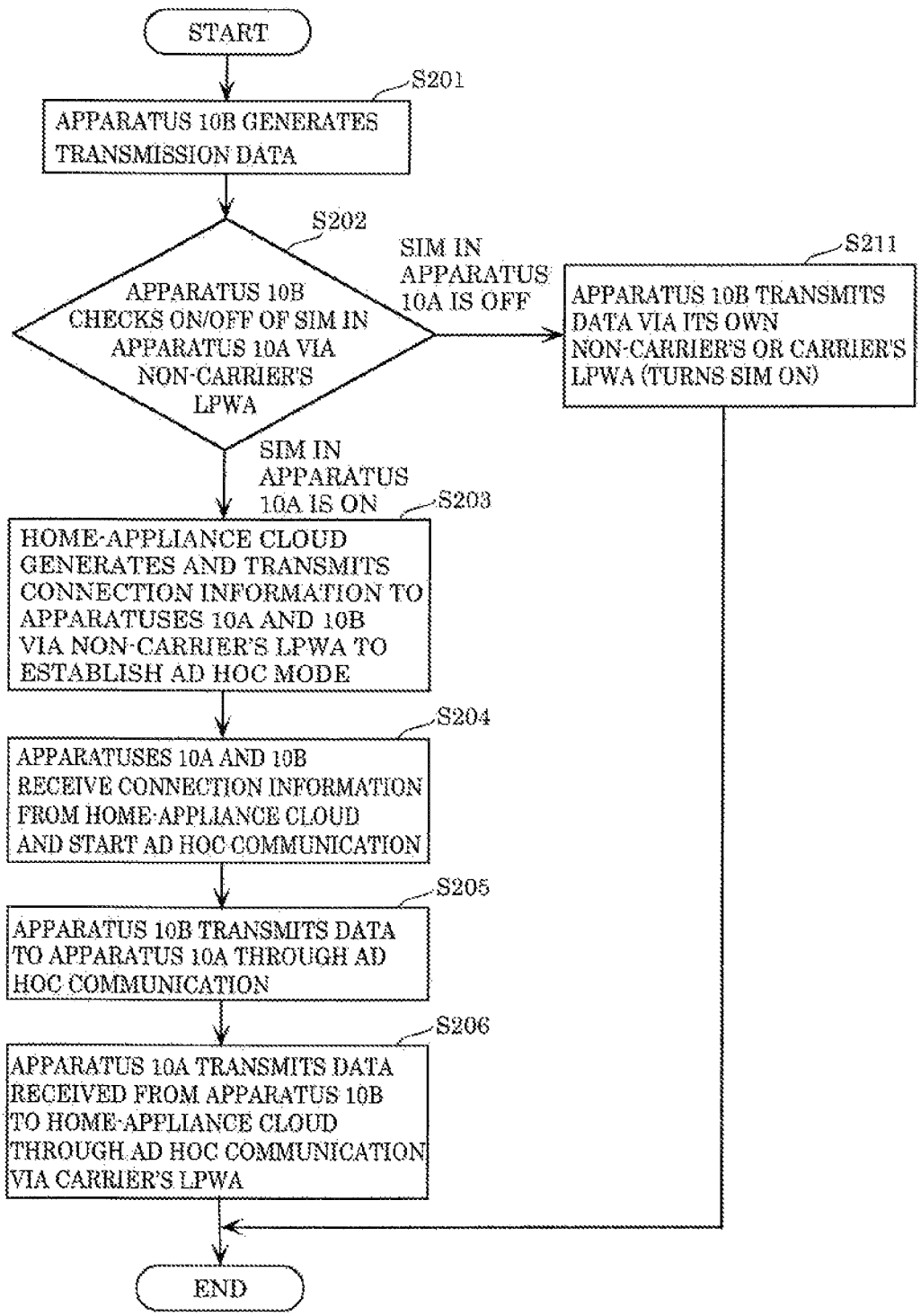
FIG. 20 is a flowchart of processing for minimizing the number of SIM cards to be used in a home.

FIG. 19 is a third illustration of a configuration for minimizing the number of SIM cards used in a home. FIG. 20 is a flowchart illustrating processing for minimizing the number of SIM cards used in a home.

A description is given of how to establish Wi-Fi ad-hoc communication between apparatuses 10A and 10B in the aforementioned case where apparatus 10B wants to carry out communication.

As illustrated in FIG. 20, it is assumed that apparatus 10B has generated data to be transmitted (transmission data) in step S201. Then, apparatus 10B confirms the ON/OFF state of the SIM in apparatus 10A in the same home via non-carrier's LPWA (step S202).

If the SIM in apparatus 10A is ON ("SIM in apparatus 10A is ON" in step S202), the home-appliance cloud generates connection information described below and transmits the connection information to apparatuses 10A and 10B via non-carrier's LPWA in order to establish ad-hoc mode connection (step S203). The connection information includes an ESSID (SSID), a wireless channel, and WEP (encrypted key).

Apparatuses 10A and 10B receive the connection information transmitted from the home-appliance cloud and directly connect to each other in the ad hoc mode, using the received connection information, and start ad-hoc communication (step S204).

Apparatus 10B transmits the data generated in step S201 to apparatus 10A through the ad hoc communication (step S205).

Apparatus 10A transmits the data received from apparatus 10B in step S205 to the home-appliance cloud through the ad hoc communication via carrier's LPWA in apparatus 10A (step S206).

If the SIM in apparatus 10A is OFF in step S202 ("SIM in apparatus 10A is OFF" in step S202), apparatus 10B transmits the data via the non-carrier's LPWA communication module or carrier's LPWA communication module of apparatus 10B. If necessary for the above transmission, apparatus 10B may turn on a SIM in the communication module to be used.

In this way, in the case where it is found that apparatuses 10A and 10B are in the same home within the home-appliance cloud, apparatuses 10A and 10B establish ad-hoc communication using connected communication means (in FIG. 19, non-carrier's LPWA), and apparatus 10B transmits (or receives) data through the ad-hoc communication via carrier's LPWA in apparatus 10A.

This eliminates the need to turn on SIMs in apparatus 10B and thereby reduces the cost to be charged based on the number of SIMs.

While non-carrier's LPWA has been used to establish ad-hoc communication, for example in the case where apparatuses 10A and 10B also has a communication function using Bluetooth (registered trademark), the Bluetooth function of a smartphone may be used to establish connection between the smartphone and apparatuses 10A and 10B, acquire information such as an ESSID from the home-appliance cloud via the smartphone, and establish ad-hoc mode connection between apparatuses 10A and 10B.

Apparatus 10A may also use carrier's LPWA to acquire information necessary for establishing ad-hoc mode communication from the home-appliance cloud. In this way, the number of carrier's LPWA modules to be used for data transmission and reception between apparatuses can be narrowed down to one. This reduces the number of home appliances housed in carrier's LPWA and to avoid radio interference due to a large number of apparatuses being housed in carrier's LPWA.

(2) In the Case of Billing Based on Total Amount of Data Transmitted Through Communication Lines In the case where there is no Wi-Fi access points (APs) in the place where apparatus 10 is installed, or in the case where there is an access point in that place but Wi-Fi connection settings are not made for apparatus 10 due to the inconvenience of operation of connecting apparatus 10 to the Wi-Fi access point becoming a barrier, non-carrier's LPWA and carrier's LPWA are switched and used in order to achieve communication between apparatus 10 and the home-appliance cloud. This strikes a balance between costs required for communication and comfortability (e.g., response of apparatus 10 or applications) of the user who operates apparatus 10 or a smartphone application relating to apparatus 10.

As the second case, consider a case in which, as a billing system for SIMs in in carrier's LPWA, the number of SIMs can be freely set and costs are charged based on the total amount of data transmitted through communication lines.

In this case, more costs are charged for communication as the user uses more communication functions using carrier's LPWA. In contrast, if non-carrier's LPWA is used with priority in order to keep down the costs, the speed of response from corresponding applications may decrease due to a low communication speed of non-carrier's LPWA, or in the event of emergency such as the occurrence of a failure in apparatus 10, large amounts of time may be required to provide a notification indicating, for example, failure conditions of apparatus 10, to the home-appliance cloud. That is, a delay will occur in customer support of apparatus 10 or the detection of a failure on the user side of apparatus 10.

Accordingly, it is necessary to appropriately select a communication system to be used, depending on the size of data to be transmitted from apparatus 10 to the cloud, the degree of urgency of that data (until when data transmission has to be completed), and assumed speeds of carrier's LPWA and non-carrier's LPWA.

The next description is given of how to switch the communication system in apparatus 10 in the aforementioned billing system. Here, each communication path is based on the following assumption.

Carrier's LPWA always enables communication and is charged based on the volume of communication.

Wi-Fi enables communication when connection settings have been made.

Non-carrier's LPWA always enables communication and is either free of charge or charged based on the volume of communication. However, non-carrier's LPWA is much more inexpensive than carrier's LPWA.

Figure 21:
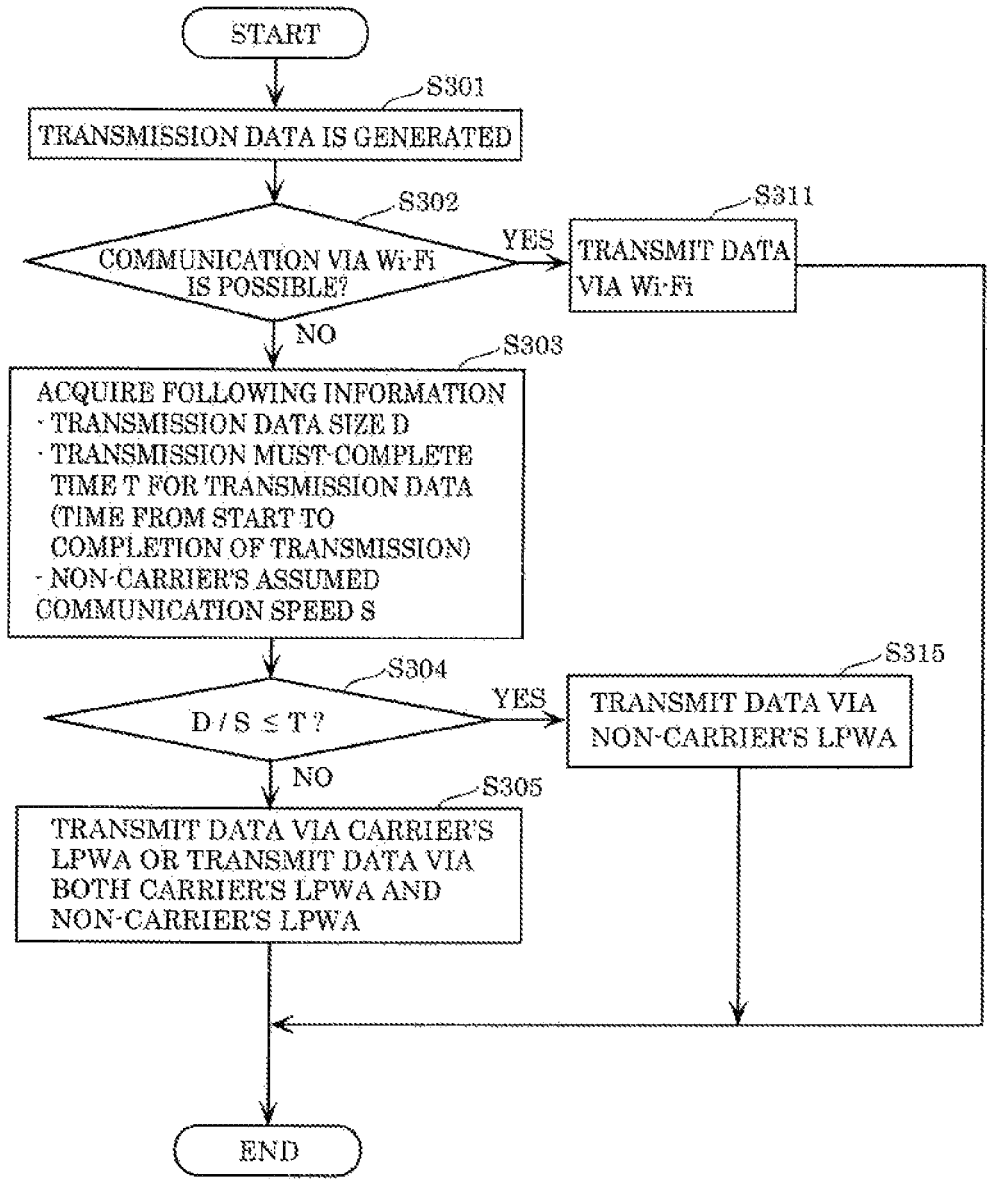
FIG. 21 is an illustration of a second example of how to select a communication system when Wi-Fi connection is not possible.

FIG. 21 is an illustration of a second example of how to select a communication system when connection via Wi-Fi is not possible. More specifically, FIG. 21 is a flowchart illustrating which communication system is to be used for data transmission when apparatus 10 has generated data to be transmitted to the home-appliance cloud. Note that processing of communication using a communication module that has a lower second indicator, i.e., runs at a lower communication speed, or that has a lower third indicator, i.e., requires a lower communication cost, among a plurality of long-distance communication modules included in apparatus 10 is illustrated in FIG. 21. Processing for identifying another communication module when communication using the identified communication module takes a relatively long period of time is also illustrated.

As illustrated in FIG. 21, it is assumed that apparatus 10 has generated data to be transmitted (transmission data) in step S301. Then, apparatus 10 checks whether communication via Wi-Fi is possible, i.e., determines whether communication via Wi-Fi is possible (step S302). Apparatus 10 stores the result of the determination as communication information.

If having determined that communication via Wi-Fi is not possible (No in step S302), apparatus 10 acquires the following information (step S303). The information acquired by apparatus 10 includes transmission data size D, the time from the start of transmission to the completion thereof, i.e., transmission must-complete time T for the transmission data, and assumed communication speed S of non-carrier's LPWA.

Next, apparatus 10 determines whether the time required to transmit the transmission data (DS) falls within the transmission must-complete time T for the transmission data, i.e., time D/S is less than or equal to time T (whether D/S≤T is satisfied) (step S304).

If having determined that time D/S is not less than or equal to time T (No in step S304), apparatus 10 transmits the data generated in step S301 via carrier's LPWA (step S305). At this time, the data may be transmitted via both carrier's LPWA and non-carrier's LPWA.

If having determined that time D/S is less than or equal to time T (Yes in step S304), apparatus 10 transmits the data via non-carrier's LPWA (step S315).

If having determined in step S302 that communication via Wi-Fi is possible (Yes in step S302), apparatus 10 transmits the data via Wi-Fi (step S311).

Although not illustrated in the flowchart in FIG. 21, if D'/S'>T' is satisfied during the data transmission via non-carrier's LPWA, where S' is the actual transmission speed, D' is that amount of data that has not been transmitted yet, and T' is the remaining amount of transmission must-complete time, communication may be switched mid-processing to communication via carrier's LPWA because the data transmission will not be completed within original time T.

In this way, non-carrier's LPWA is used as much as possible for data transmission by using the size of data to be transmitted, the transmission must-complete time for the transmission data, and the assumed communication speed of non-carrier's LPWA. This reduces the usage time of cost-consuming carrier's LPWA (the volume of communication) and reduces the communication cost.

Alternatively, a past communication speed stored in apparatus 10 may be used as non-carrier's assumed communication speed S. At this time, a communication speed that has been stored under similar conditions of use of non-carrier's LPWA, such as in the same time period on the same day in the past, may be used.

As another alternative, whether communication via Wi-Fi is possible may be detected as appropriate even during communication via non-carrier's LPWA or carrier's LPWA, and if communication via Wi-Fi has become possible, the communication via non-carrier's LPWA or carrier's LPWA may be stopped and switched to communication using the Wi-Fi. This makes it possible to smoothly change the communication system to Wi-Fi even when the Wi-Fi access point that has been temporarily stopped returns to its original state.

In the case where the cost required for communication via carrier's LPWA (communication cost) is fixed up to a predetermined amount of data, carrier's LPWA may be used for communication until the predetermined amount of data has reached, irrespective of values D, T, and S.

In the case where high-speed communication is required at any rate, irrespective of values D, T, and S (e.g., an error notification involving dangers), communication means to be used may be designated as one of the attributes of generated data. For example, in the case of an error notification involving dangers, carrier's LPWA may always be used as communication means, irrespective of values D, T, and S.

SUMMARY

The foregoing description has been given of IoT home appliances that can provide various application services to users of apparatuses 10 by being connected to clouds. The IoT home appliances include a plurality of communication systems (Wi-Fi, carrier's LPWA, and non-carrier's LPWA; but the communication systems are not limited thereto) as communication means for establishing connection to the clouds. By appropriately switching the communication system in view of the features (e.g., a communication speed, a delay time, and costs required for communication) of each communication system and the attribute of data transmitted by apparatus 10 (e.g., the size of data, the degree of emergency of the data or the time required to complete the data transmission), it is possible to strike a balance between the communication speed and a reduction in communication cost.

The IoT home appliances that include a plurality of communication systems allow users of the appliances to receive various application services, e.g., control of an air conditioner from the place away from home, without Wi-Fi-settings.

Other examples of the configuration of apparatus 10 and a communication method executed by apparatus 10 will be described.

Figure 22:
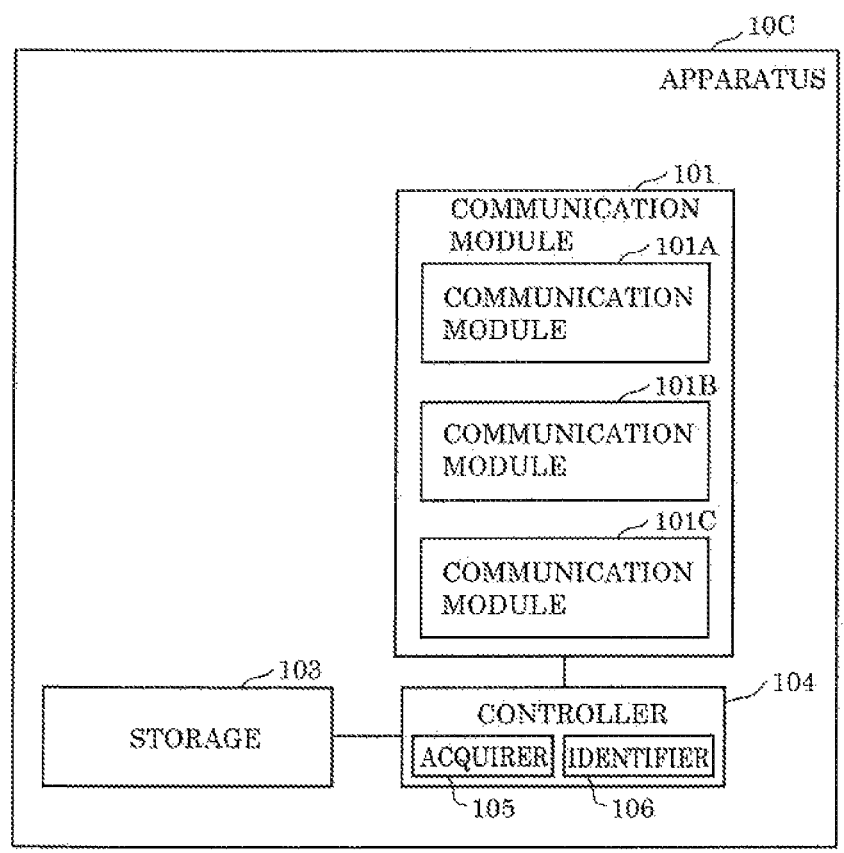
FIG. 22 is a diagram illustrating another configuration of blocks of an apparatus.

FIG. 22 is a diagram illustrating a configuration of blocks of apparatus 10C as another example of the configuration of apparatus 10.

As illustrated in FIG. 22, apparatus 10C includes a plurality of communication modules 101A, 101B, and 101C, storage 103, controller 104, acquirer 105, and identifier 106.

Communication modules 101A, 101B, and 101C are wireless communication modules for connecting apparatus 10C to a server that manages apparatus 10C via a plurality of different networks.

Storage 103 stores, for each of the networks, characteristics regarding communication.

Acquirer 105 acquires communication information that indicates, for each of communication modules 101A, 101B, and 101C, whether communication with the server via the communication module is possible.

Identifier 106 identifies a specific communication module from among communication modules 101A, 101B, and 101C, the specific communication module being indicated by the communication information as being a communication module via which communication is possible, and being selected based on the above-described characteristics.

Controller 104 causes the specific communication module identified by identifier 106 to connect to the server so as to enable communication.

Figure 23:
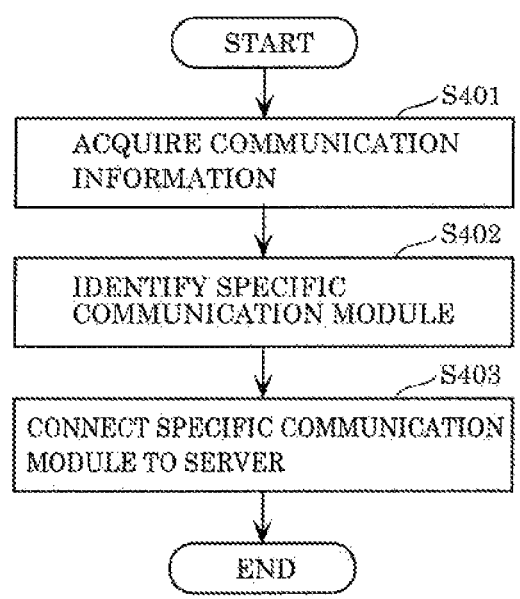
FIG. 23 is a flowchart of a communication method executed by an apparatus.

FIG. 23 is a flowchart illustrating a communication method executed by apparatus 10C, as another example of the communication method executed by apparatus 10.

In step S401 (acquisition step), the apparatus acquires the communication information that indicates, for each of communication modules 101A, 101B, and 101C, whether communication with the server via the communication module is possible.

In step S402 (identification step), the apparatus identifies a specific communication module from among communication modules 101A, 101B, and 101C, the specific communication module being indicated by the communication information as being a communication module via which communication is possible, and being selected based on the above-described characteristics.

In step S403 (control step), the apparatus causes the specific communication module identified in the identification step to connect to the server so as to enable communication.

Accordingly, apparatus 10C is appropriately connected to and controlled by a control cloud.

As described above, the apparatus according to the present embodiment can appropriately connect to and communicate with the server via a communication module via which communication with the server is possible and that is selected based on the characteristics regarding communication via a network from among the plurality of communication modules included in the apparatus. Accordingly, the apparatus can be appropriately connected to and controlled by the control cloud.

Also, the apparatus can communicate with the server via a communication module that provides a higher degree of stability in communication among the plurality of communication modules included in the apparatus. Using more stable communication allows the apparatus to more appropriately connect to the control cloud.

Also, the apparatus can communicate with the server via a communication module that runs at a lower speed among the plurality of communication modules included in the apparatus. In general, low-speed communication requires a smaller amount of information processing, and thus achieves lower power consumption and a lower cost for communication. Using lower-speed communication allows the apparatus to be more appropriately connected to and controlled by the control cloud while suppressing the amount of information processing and power consumption.

In the case where a communication module that runs at a lower speed has been selected from among the plurality of communication modules included in the apparatus and communication via the communication module is expected to take an excessively long time, the apparatus can prevent such lengthy communication from occurring by again selecting another communication module different from the previous one. Accordingly, the apparatus can be more appropriately connected to and controlled by the control cloud while preventing the occurrence of lengthy communication.

Also, the apparatus can communicate with the server via a communication module that requires a lower cost for communication among the plurality of communication modules included in the apparatus. Using lower-cost communication allows the apparatus to be more appropriately connected to and controlled by the control cloud while suppressing the amount of information processing and power consumption.

In the case where the apparatus includes a short-distance communication module, the apparatus can communicate with the server via the short-distance communication module. The short-distance communication module establishes a communication like with a base station (access point) deployed in a home and communicates with the base station, and a communication channel from the base station to the server is assumed to be prepared separately by the user. In this case, relatively high-speed and relatively low-power-consuming communication can be realized in the communication path from the apparatus to the base station. There is a further advantage in that the cost required for communication from the apparatus to the base station is reduced to zero or a relatively small figure. Using relatively high-speed and relatively low-power-consuming communication allows the apparatus to be appropriately connected to and controlled by the control cloud.

In the case where there is a plurality of apparatuses in a home, only one apparatus among the plurality of apparatuses communicates with the server via its long-distance communication module, and the other apparatuses connect to the one apparatus via their short-distance communication modules and can communicate with the server by relay of communication via the one apparatus. Accordingly, all of the plurality of apparatuses can communicate with the server while the number of apparatuses that communicate with the server via the long-distance communication module is reduced to one. Using long-distance communication via the one apparatus allows the plurality of apparatuses to be more appropriately connected to and controlled by the control cloud.

In the case where only one apparatus among the plurality of apparatuses communicates with the server via its long-distance communication module, this apparatus uses a communication module that provides higher communication quality to communicate with the server. Using long-distance communication via the one apparatus allows the plurality of apparatuses to be connected to and controlled by the control cloud with high quality.

Also, the apparatus can be more readily and more appropriately be connected to and controlled by the control cloud via the carrier's LPWA communication module and the non-carrier's LPWA communication module, both serving as long-distance communication modules, and the Wi-Fi communication module serving as a short-distance communication module.

As described above, an embodiment of the present disclosure has been described by way of example of the technique disclosed in the present application. Attached drawings and detailed descriptions are provided to describe the embodiment.

Accordingly, the constituent elements illustrated in the attached drawings and described in the detailed descriptions may include not only essential constituent elements necessary to solve the problems, but also constituent elements that are not essential to solve the problem, in order to illustrate the above-described implementations. Therefore, such unessential constituent elements illustrated in the attached drawings and described in the detailed descriptions should not immediately be regarded as essential constituent elements.

The above-described embodiment is merely illustrative example of the technique according to the present disclosure, and therefore, various modifications, replacement, addition, and omission are possible within the scope of claims or within the equivalent range of the claims.

INDUSTRIAL APPLICABILITY

The present disclosure is applicable to apparatuses that can be appropriately connected to and controlled by control clouds. Specifically, the present disclosure is applicable to home appliances such as refrigerators, washing machines, and air conditioners, or other devices.

REFERENCE MARKS IN THE DRAWINGS 10, 10A, 10B, 10C apparatus
101, 101A, 101B, 101C communication module
102, 102A, 102B, 102C, 108 holder
103 storage
104 controller
105 acquirer
106 identifier
107 function module
109 power source
110 battery
111 operation part
112 display

The invention claimed is:

1. An apparatus, comprising:
a plurality of communication modules for wirelessly connecting the apparatus to a server that manages the apparatus, via a plurality of networks different from one another;
a storage that stores, for each of the plurality of networks, a characteristic regarding communication via the network;
an acquirer that acquires communication information that indicates, for each of the plurality of communication modules, whether communication with the server via the communication modules is possible;
an identifier that identifies a specific communication module from among the plurality of communication modules, the specific communication module being indicated by the communication information as being a communication module via which communication is possible, and being selected based on the characteristic; and
a controller that causes the specific communication module identified by the identifier to connect to the server to enable communication,
wherein the plurality of communication modules include a plurality of long-distance communication modules for long-distance wireless communication,
each of the plurality of long-distance communication modules is associated with a second indicator as the characteristic, the second indicator indicating a magnitude of a speed of communication via the long-distance communication module, and
the identifier calculates a time required to transmit a finite length of data via the specific communication module, and if the time calculated is greater than a threshold value, identifies, as the specific communication module, a long-distance communication module associated with the second indicator that indicates a higher speed among the plurality of long-distance communication modules, and
if the time calculated is less than or equal to the threshold value, the identifier identifies, as a new specific communication module, a long-distance communication module different from the specific communication module.

2. The apparatus according to claim 1, wherein
each of the plurality of long-distance communication modules is associated with a first indicator as the characteristic, the first indicator indicating a degree of stability in communication via the long-distance communication module, and
the identifier identifies, as the specific communication module, a long-distance communication module associated with the first indicator that indicates a higher degree of stability among the plurality of long-distance communication modules.

3. The apparatus according to claim 1, wherein
each of the plurality of long-distance communication modules is associated with a third indicator as the characteristic, the third indicator indicating a cost required for communication via the long-distance communication module, and
the identifier identifies, as the specific communication module, a long-distance communication module associated with the third indicator that indicates a lower cost among the plurality of long-distance communication modules.

4. The apparatus according to claim 1, wherein
the plurality of communication modules include a short-distance communication module for short-distance wireless communication, and
when the communication information indicates that communication via the short-distance communication module is possible, the identifier identifies the short-distance communication module as the specific communication module, irrespective of whether communication with the server via the long-distance communication module is possible.

5. The apparatus according to claim 1, wherein
the plurality of communication modules include:
a carrier's low-power, wide-area (LPWA) communication module and a non-carrier's LPWA communication module, both serving as long-distance communication modules; and
a Wi-Fi communication module serving as a short-distance communication module.

6. A system, comprising:
the apparatus according to claim 1; and
the server that manages the apparatus.

7. An apparatus,
the apparatus including a plurality of apparatuses installed in one home,
the apparatus comprising:
a plurality of communication modules for wirelessly connecting the apparatuses to a server that manages the server, via a plurality of networks different from one another, the apparatuses each being the apparatus;
a storage that stores, for each of the plurality of networks, a characteristic regarding communication via the network;
an acquirer that acquires communication information that indicates, for each of communication modules, whether communication with the server via the communication module is possible;
an identifier that identifies a specific communication module from among the plurality of communication modules, the specific communication module being indicated by the communication information as being a communication module via which communication is possible, and being selected based on the characteristic; and
a controller that causes the specific communication module identified by the identifier to connect to the server to enable communication,
wherein each of the plurality of the apparatuses includes the plurality of communication modules that include a long-distance communication module for long-distance wireless communication and a short-distance communication module for short-distance wireless communication,
except one apparatus among the plurality of apparatuses, the other apparatus includes the identifier that connects directly to the one apparatus via the short-distance communication module of the other apparatus,
the one apparatus among the plurality of apparatuses includes the identifier that identifies the long-distance communication module of the one apparatus as the specific communication module and that connects directly to the other apparatus via the short-distance communication module of the one apparatus,
the one apparatus among the plurality of apparatuses further includes the controller that relays communication between the long-distance communication module of the one apparatus and the short-distance communication module of the one apparatus.

8. The apparatus according to claim 7, wherein the one apparatus among the plurality of apparatuses is an apparatus that includes a long-distance communication module that provides higher communication quality among the plurality of long-distance communication modules of the plurality of apparatuses.

9. A communication method executed by an apparatus, the apparatus including:

a plurality of communication modules for wirelessly connecting the apparatus to a server that manages the apparatus, via a plurality of networks different from one another; and a storage that stores, for each of the plurality of networks, a characteristic regarding communication via the network, the plurality of communication modules including a plurality of long-distance communication modules for long-distance wireless communication, and each of the plurality of long-distance communication modules being associated with a second indicator as the characteristic, the second indicator indicating a magnitude of a speed of communication via the long-distance communication module, the communication method comprising:

acquiring communication information that indicates, for each of the plurality of communication modules, whether communication with the server via the communication module is possible;

identifying a specific communication module from among the plurality of communication modules, the specific communication module being indicated by the communication information as being a communication module via which communication is possible, and being selected based on the characteristic; and connecting the specific communication module identified in the identifying to the server to enable communication, wherein in the identifying, calculating a time required to transmit a finite length of data via the specific communication module, and if the time calculated is greater than a threshold value, identifying, as the specific communication module, a long-distance communication module associated with the second indicator that indicates a higher speed among the plurality of long-distance communication modules, and if the time calculated is less than or equal to the threshold value, identifying, as a new specific communication module, a long-distance communication module different from the specific communication module.

* * * * *